US011999171B2

(12) United States Patent
Oki et al.

(10) Patent No.: US 11,999,171 B2

(45) Date of Patent: Jun. 4, 2024

(54) LIQUID CARTRIDGE INCLUDING PIVOTABLE PLATE MEMBER FOR OPTICAL DETECTION

(71) Applicant: BROTHER KOGYO KABUSHIKI KAISHA, Nagoya (JP)

(72) Inventors: Satoru Oki, Nagoya (JP); Masahiro Hayashi, Nishio (JP); Nanami Abe, Niigata (JP); Naoya Okazaki, Hashima (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 122 days.

(21) Appl. No.: 17/817,039

(22) Filed: Aug. 3, 2022

(65) Prior Publication Data

US 2023/0040367 A1 Feb. 9, 2023

(30) Foreign Application Priority Data

Aug. 4, 2021 (JP) ................................. 2021-128075

(51) Int. Cl.
*B41J 2/175* (2006.01)

(52) U.S. Cl.
CPC ....... *B41J 2/17566* (2013.01); *B41J 2/17553* (2013.01); *B41J 2002/17573* (2013.01)

(58) Field of Classification Search
CPC ................ B41J 2/17566; B41J 2/17553; B41J 2002/17573
See application file for complete search history.

(56) References Cited

U.S. PATENT DOCUMENTS

| | | | | |
|---|---|---|---|---|
| 11,192,382 B2 * | 12/2021 | Hayashi | ............... | B41J 2/17536 |
| 2018/0093484 A1 * | 4/2018 | Nukui | .................. | B41J 2/17503 |
| 2019/0100015 A1 * | 4/2019 | Miyao | .................. | B41J 2/17509 |
| 2022/0126590 A1 * | 4/2022 | Oki | ...................... | B41J 2/17513 |

FOREIGN PATENT DOCUMENTS

JP 2018-51907 A 4/2018

OTHER PUBLICATIONS

Extended European Search Report issued in corresponding European Patent Application No. 22188504.9, dated Dec. 6, 2022.

* cited by examiner

*Primary Examiner* — Jason S Uhlenhake
(74) *Attorney, Agent, or Firm* — Merchant & Gould P.C.

(57) ABSTRACT

A liquid cartridge includes: a cartridge case defining a liquid storage chamber; a liquid supply portion provided at the cartridge case; a residual-amount detecting portion configured to change a state of incident light according to an amount of liquid stored in the liquid storage chamber; and a plate member. The residual-amount detecting portion includes an optical access portion accessible by light traveling in a left-right direction in an attached posture of the liquid cartridge. The plate member is positioned above the liquid storage chamber and frontward of the optical access portion in the attached posture. The plate member is pivotable between a first position and a second position about an axis extending in an up-down direction. In the attached posture of the liquid cartridge, the plate member extends in a front-rear direction at the first position, and extends in a direction crossing the front-rear direction at the second position.

24 Claims, 18 Drawing Sheets

LIQUID CARTRIDGE INCLUDING PIVOTABLE PLATE MEMBER FOR OPTICAL DETECTION

REFERENCE TO RELATED APPLICATIONS

This application claims priority from Japanese Patent Application No. 2021-128075 filed on Aug. 4, 2021. The entire content of the priority application is incorporated herein by reference.

BACKGROUND ART

There has been known an inkjet recording apparatus configured to record an image on a recording sheet by ejecting ink stored in an ink cartridge through nozzles. According to one conventional inkjet recording apparatus, a new ink cartridge is configured to be attached to the apparatus each time ink is used up.

In the ink cartridge for the above-described inkjet recording apparatus, an ink supply portion is positioned on a front wall of a cartridge body. Upon attachment of the ink cartridge to the apparatus, an ink needle provided in the apparatus is inserted in the ink supply portion, thereby fixing the ink cartridge in position relative to the apparatus. Further, an IC substrate is positioned on an upper wall of the cartridge body. Upon attachment of the ink cartridge to the apparatus, the IC substrate is electrically connected to a contact of the apparatus. The upper wall of the cartridge body is further provided with a counter-detecting portion and a light-shielding plate which are configured to be detected by a residual-amount detection sensor and an attachment sensor upon attachment of the ink cartridge to the apparatus.

DESCRIPTION

Preferably, the number of sensors provided in a printer be smaller in terms of design freedom and production costs. Further, desirably, an ink cartridge be resistant to deformation which may be possibly caused by impacts impinged on the ink cartridge at the time of attachment to the printer or falling onto a floor.

In view of the foregoing, it is an object of the present disclosure to provide a liquid cartridge capable of reducing the number of sensors for a printer and being resistant to deformation by impacts.

In order to attain the above and other object, according to one aspect, the present disclosure provides a liquid cartridge attachable to a printer in an attached posture by being moved in a front-rear direction crossing an up-down direction along a gravitational direction. The liquid cartridge includes a cartridge case, a liquid supply portion, a residual-amount detecting portion, and a plate member. The cartridge case defines a liquid storage chamber therein. The liquid supply portion protrudes frontward from a front surface of the cartridge case and is configured to supply liquid stored in the liquid storage chamber to an outside of the liquid storage chamber. The residual-amount detecting portion is configured to change a state of incident light according to an amount of the liquid stored in the liquid storage chamber. The residual-amount detecting portion includes an optical access portion accessible by light traveling in a left-right direction crossing the up-down direction and the front-rear direction in the attached posture. The optical access portion is positioned above the liquid storage chamber in the attached posture. The plate member is pivotable about a pivot axis between a first position and a second position, the pivot axis extending in the up-down direction in the attached posture. The plate member is positioned above the liquid storage chamber and frontward of the optical access portion in the attached posture. In the attached posture, the plate member extends in the front-rear direction at the first position, and the plate member extends in a direction crossing the front-rear direction at the second position.

With this structure, the plate member and the optical access portion can be detected by the same sensor. Further, since the plate member can pivotally move upon application of impact during the attachment of the liquid cartridge to the printer or when the liquid cartridge falls onto a floor, the plate member is less likely to be damaged or deformed.

According to another aspect, the disclosure also provides a liquid cartridge including a cartridge case, a liquid supply portion, a cartridge detecting portion, and a plate member. The cartridge case defines a liquid storage chamber therein. The liquid supply portion protrudes frontward from a front surface of the cartridge case in a front-rear direction and is configured to supply liquid stored in the liquid storage chamber to an outside of the liquid storage chamber. The cartridge detecting portion includes an optical access portion positioned upward relative to and away from the liquid supply portion in an up-down direction crossing the front-rear direction. The optical access portion is accessible by light traveling in a left-right direction crossing the up-down direction and the front-rear direction. The optical access portion is positioned above the liquid storage chamber in the up-down direction. The plate member is pivotable about a pivot axis extending in the up-down direction between a first position and a second position. The plate member is positioned above the liquid storage chamber in the up-down direction and frontward of the optical access portion in the front-rear direction. The plate member extends in the front-rear direction at the first position, and the plate member extends in a direction crossing the front-rear direction at the second position.

With this structure, the plate member and the optical access portion can be detected by the same sensor. Further, since the plate member can pivotally move upon application of impact during the attachment of the liquid cartridge to the printer or when the liquid cartridge falls onto a floor, the plate member is less likely to be damaged or deformed.

Figure 4B:
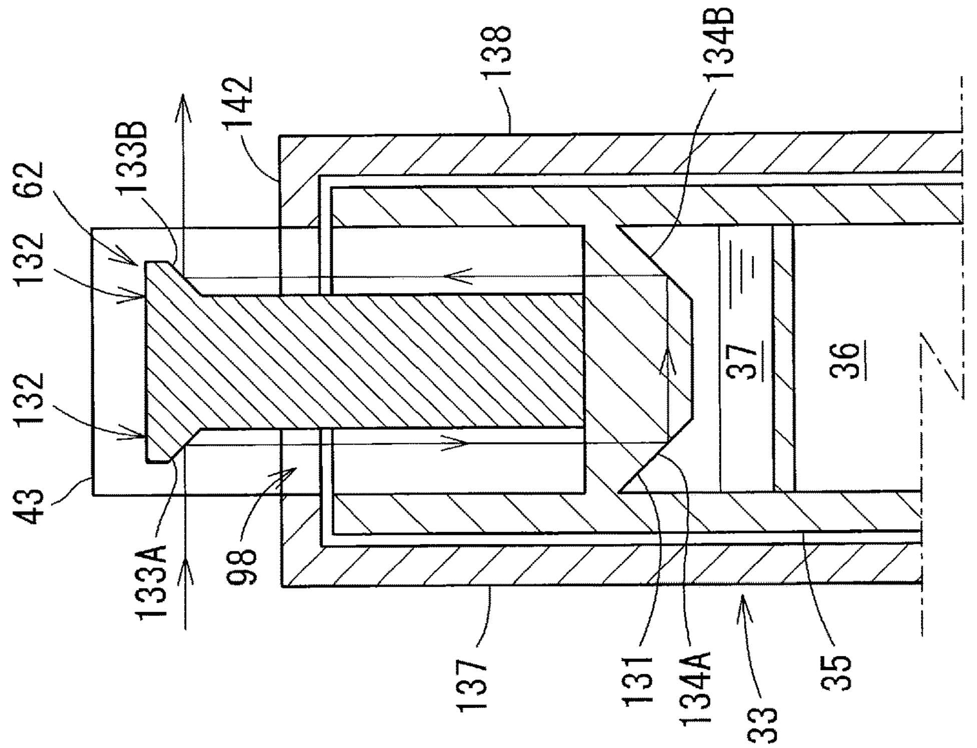
Figure 4A:
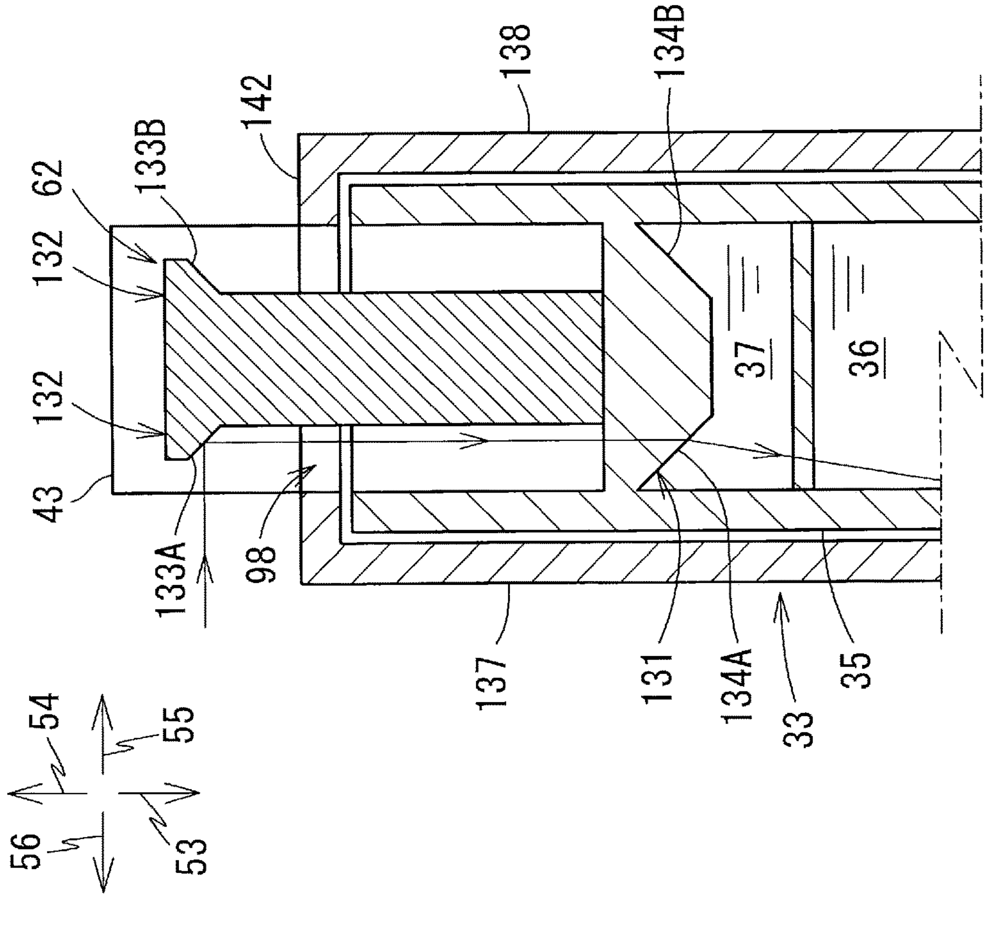

FIG. 4A illustrates a prism 131 and a reflection plate 132 in a state where reflection surfaces 134A and 134B of the prism 131 do not reflect incident light.

FIG. 4B illustrates the prism 131 and the reflection plate 132 in a state where the reflection surfaces 134A and 134B of the prism 131 reflect incident light.

Figure 5:
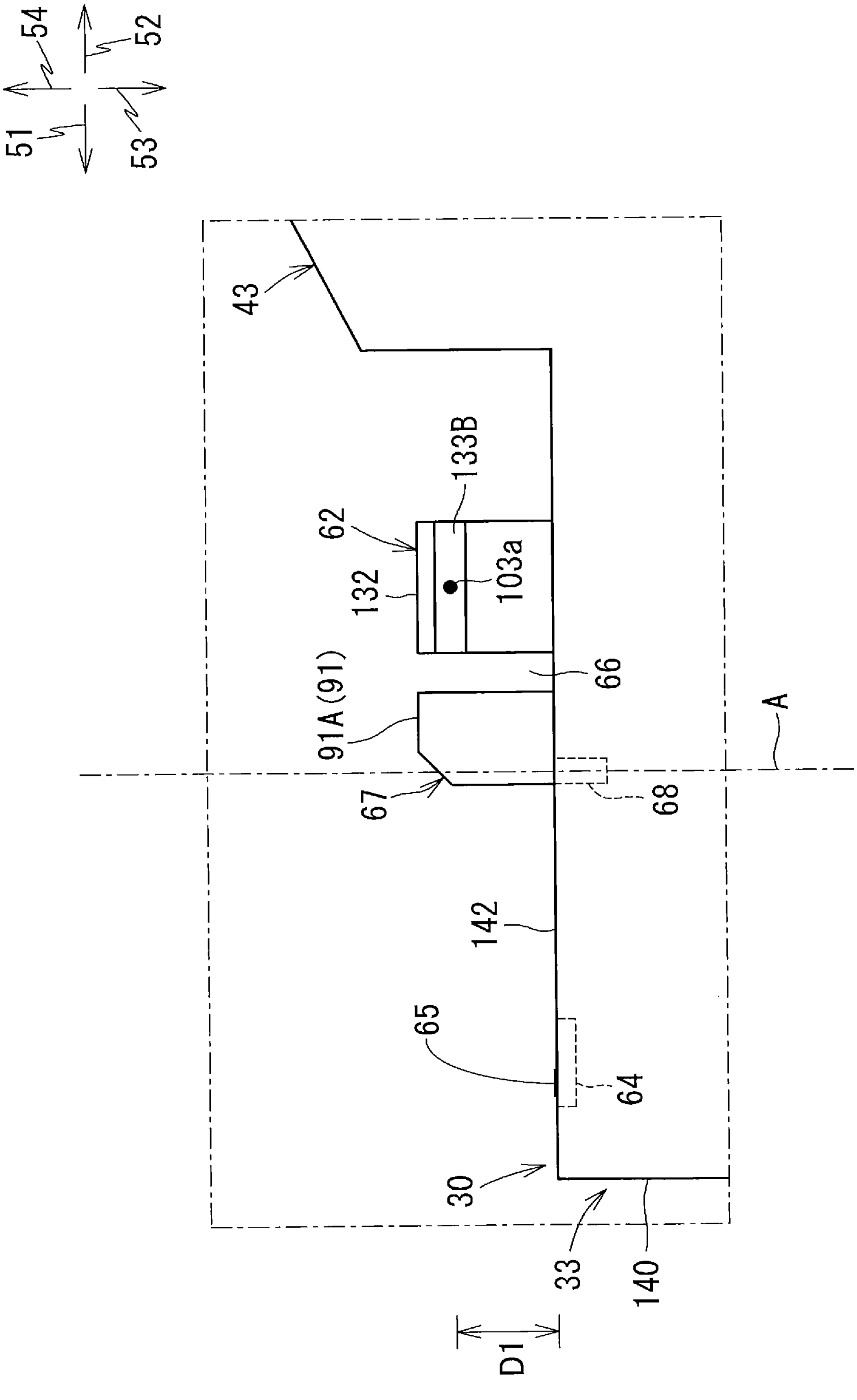

FIG. 5 is a partially enlarged right side view of an area near a plate member 67 of the ink cartridge 30.

Figure 6A:
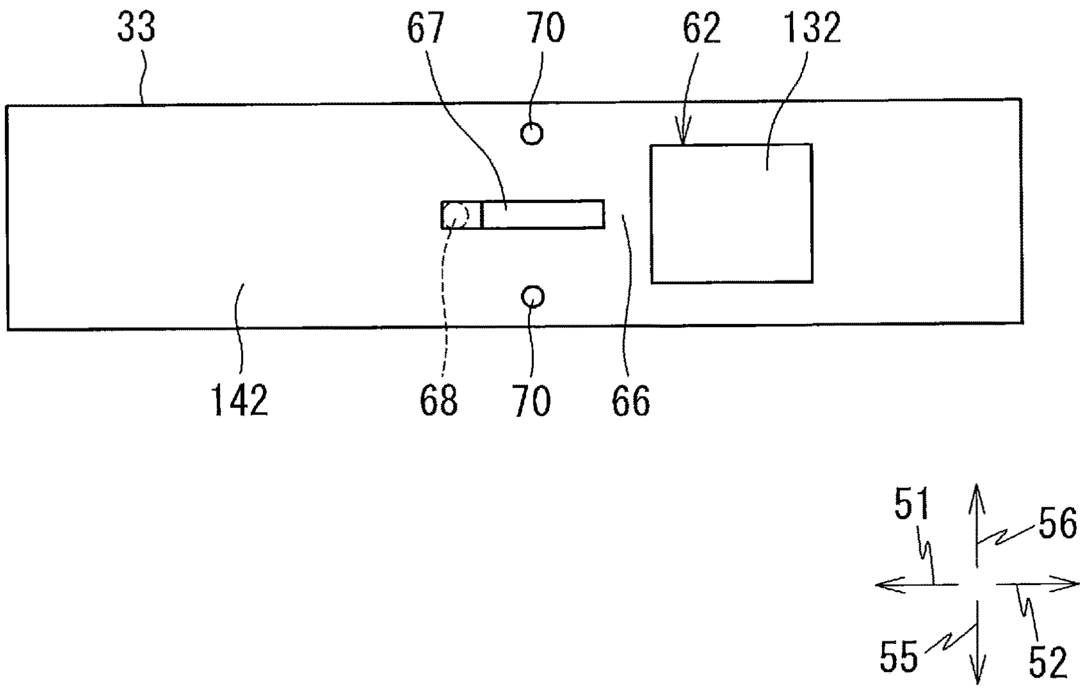

FIG. 6A is a plan view of the ink cartridge 30 in a state where the plate member 67 is at its first position.

Figure 6B:
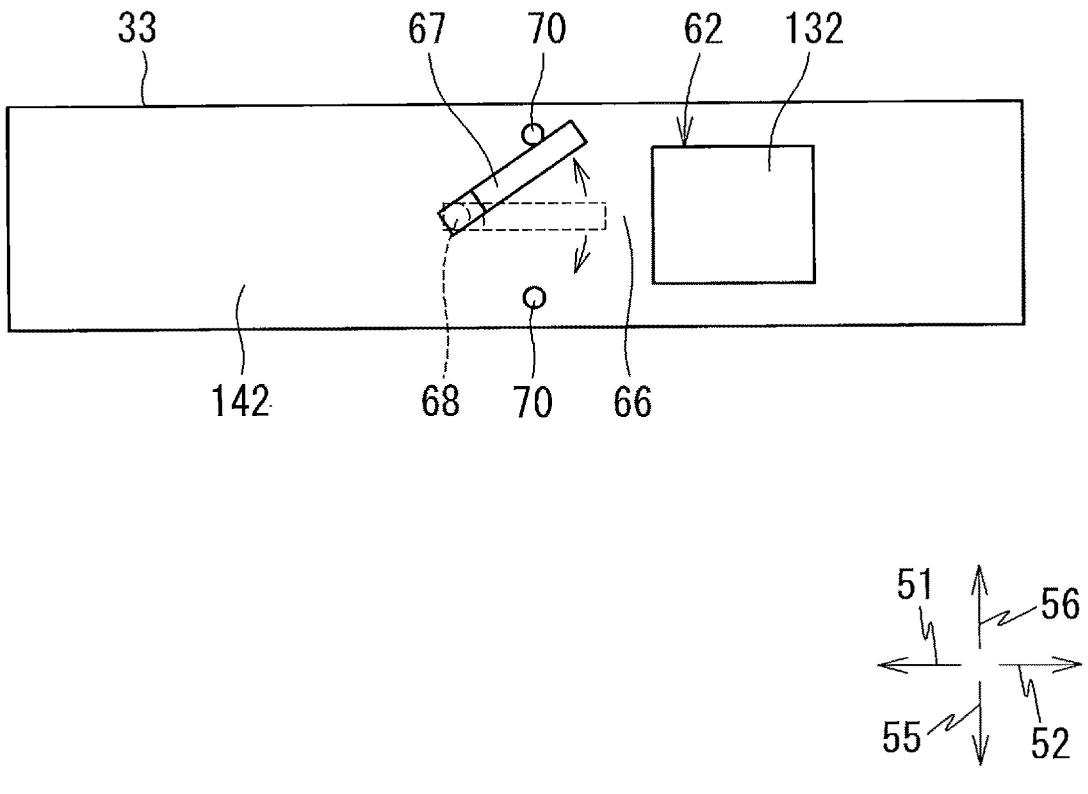

FIG. 6B is a plan view of the ink cartridge 30 in a state where the plate member 67 is at its second position.

Figure 7:
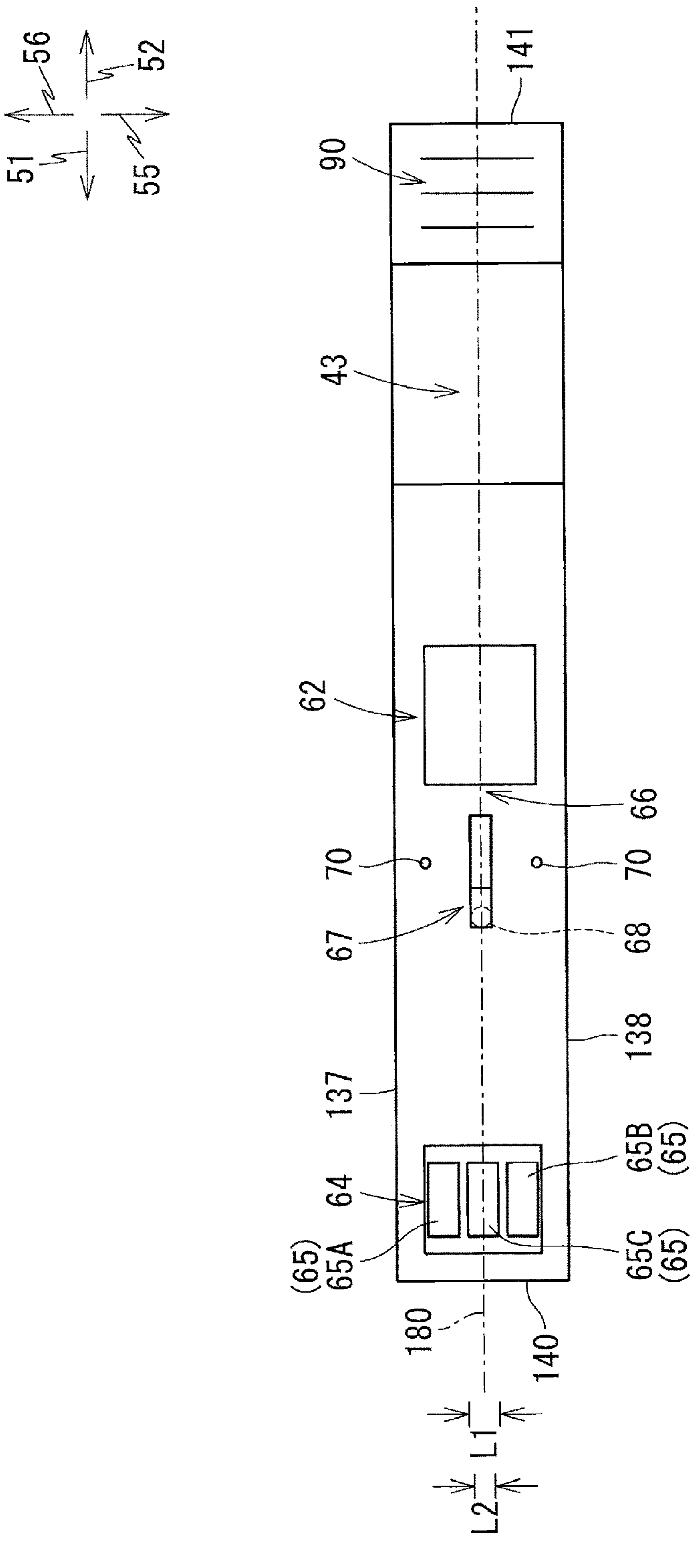

FIG. 7 is a plan view of the ink cartridge 30.

Figure 8:
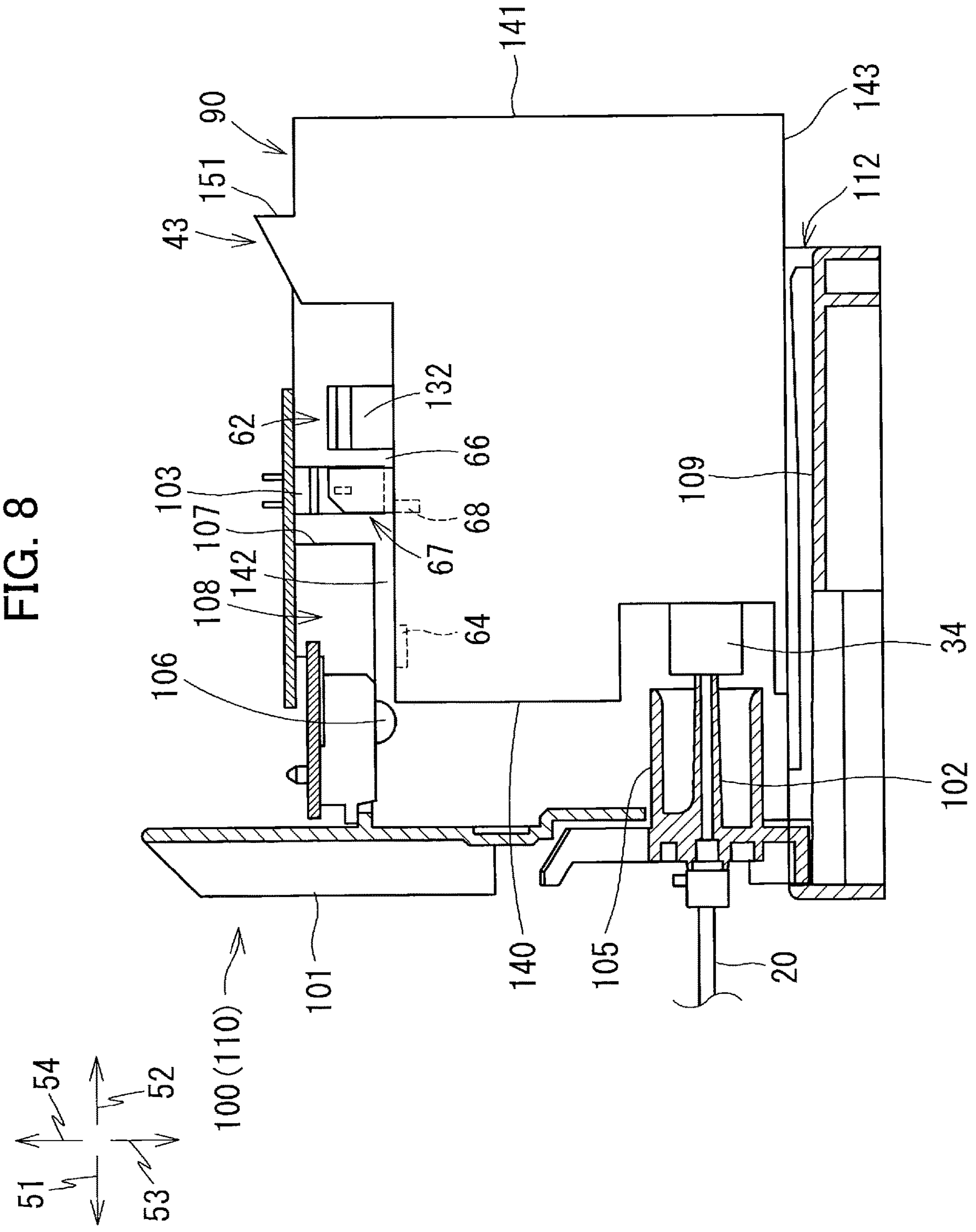

FIG. 8 is a vertical cross-sectional view of the ink cartridge 30 and the cartridge receiving portion 110 in a state where the plate member 67 is detected by a sensor 103 of the cartridge receiving portion 110.

Figure 9:
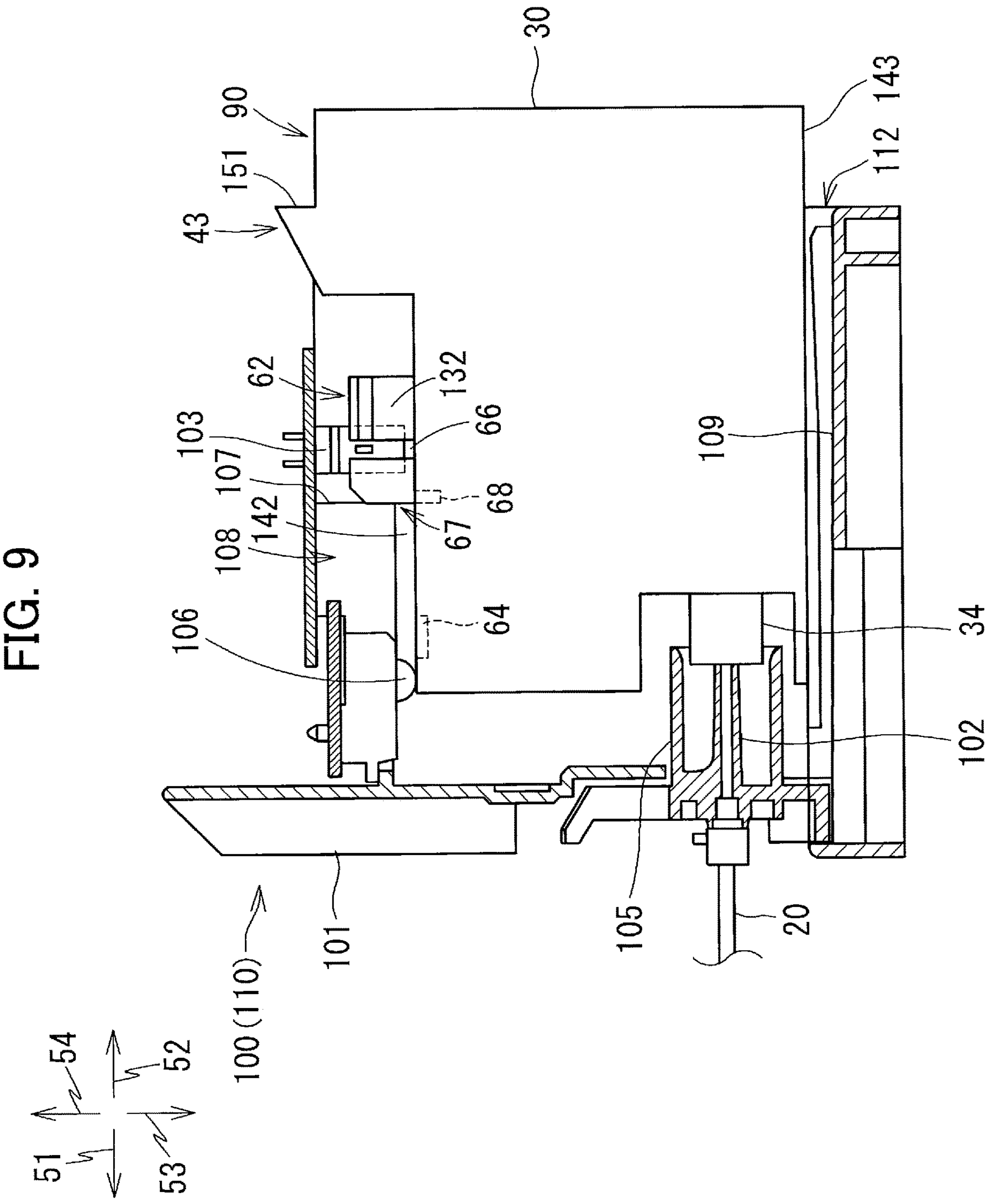

FIG. 9 is a vertical cross-sectional view of the ink cartridge 30 and the cartridge receiving portion 110 in a state where an ink needle 102 enters in an ink supply opening 71 of an ink supply portion 34, and a space 66 is positioned at an optical path 103*a* of the sensor 103.

Figure 10:
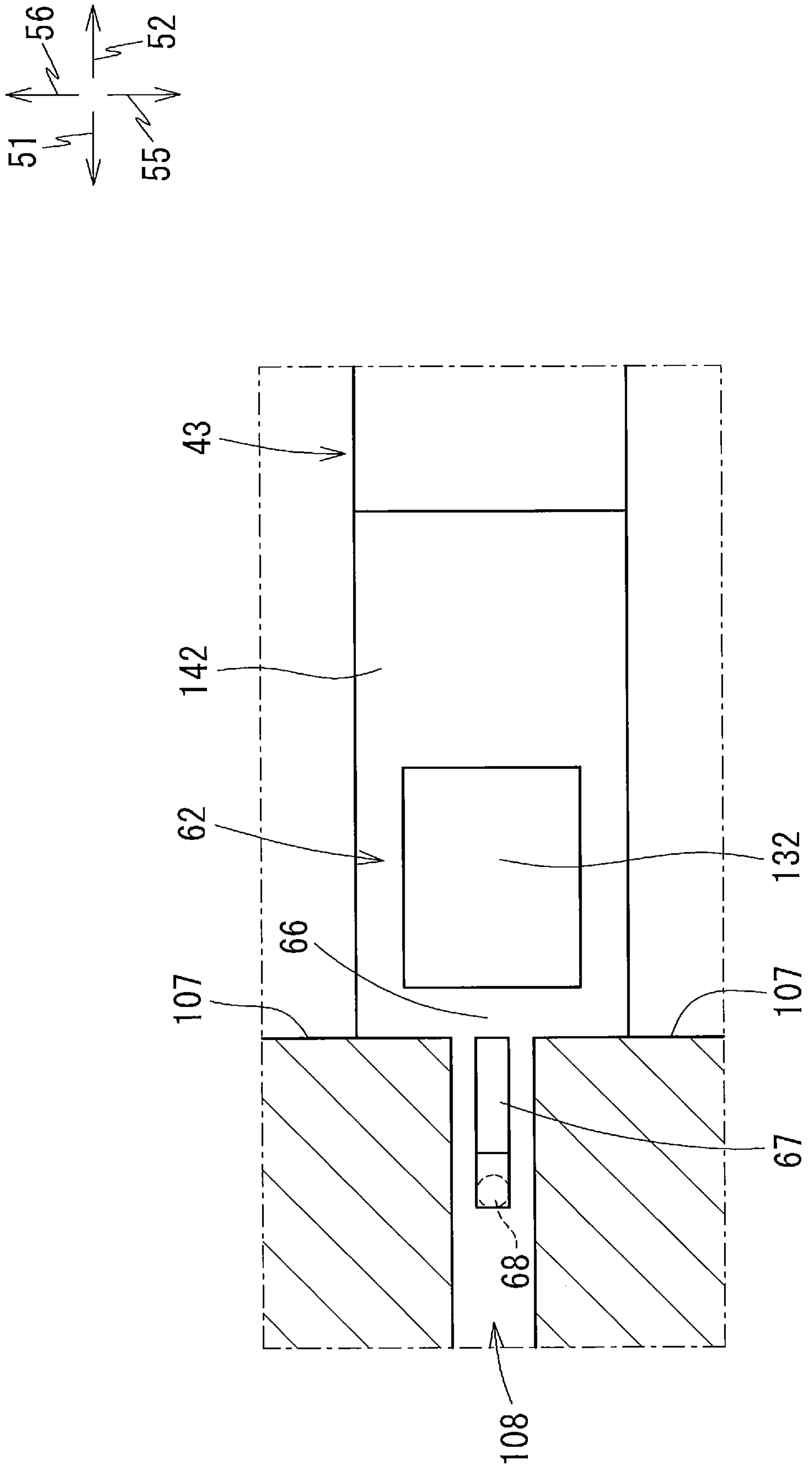

FIG. 10 is a partially enlarged plan view illustrating a state where the plate member 67 is inserted in a slit 108.

Figure 11:
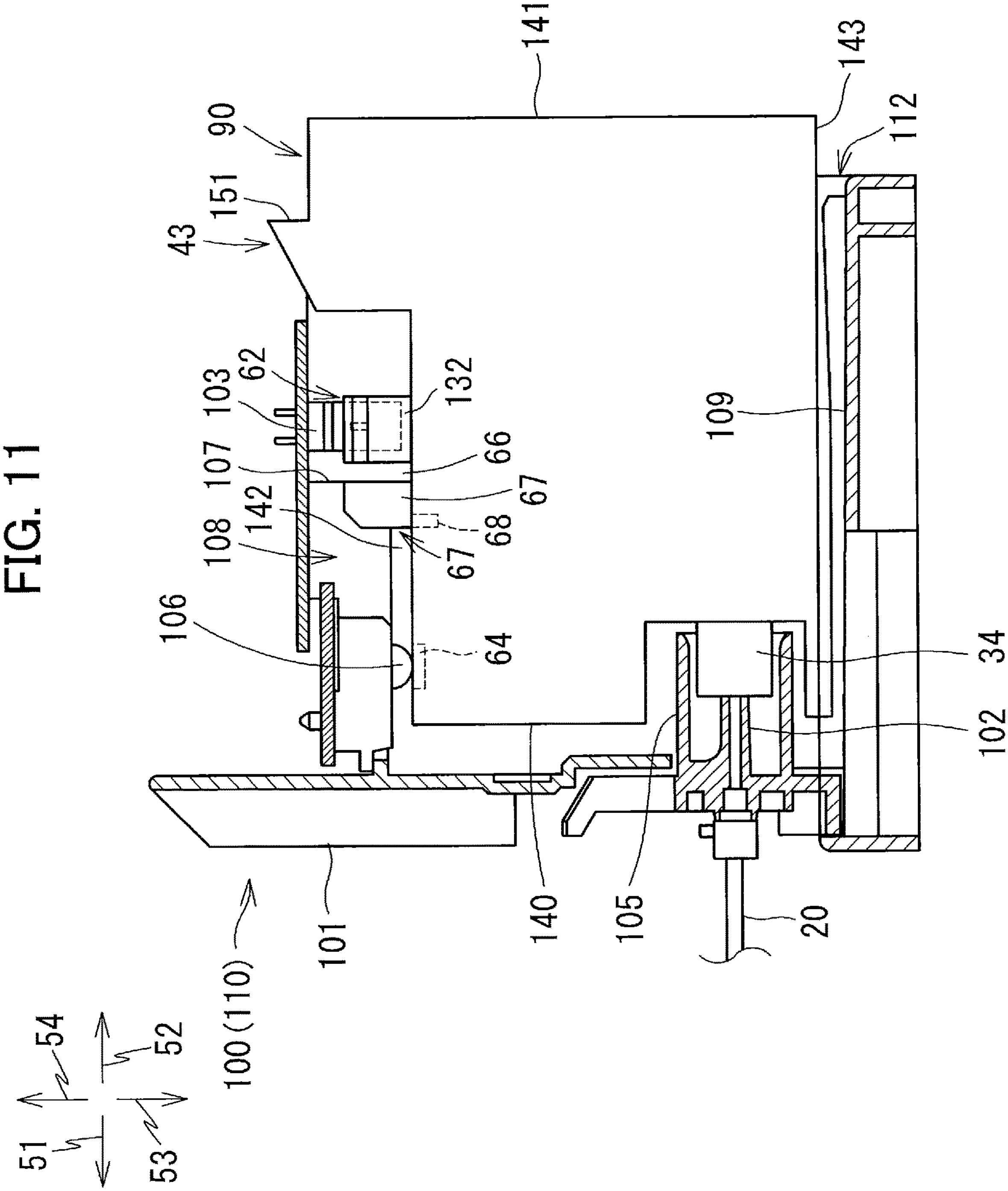

FIG. 11 is a vertical cross-sectional view of the ink cartridge 30 and the cartridge receiving portion 110 in a state where the ink cartridge 30 is fixed in position relative to the cartridge receiving portion 110.

Figure 12:
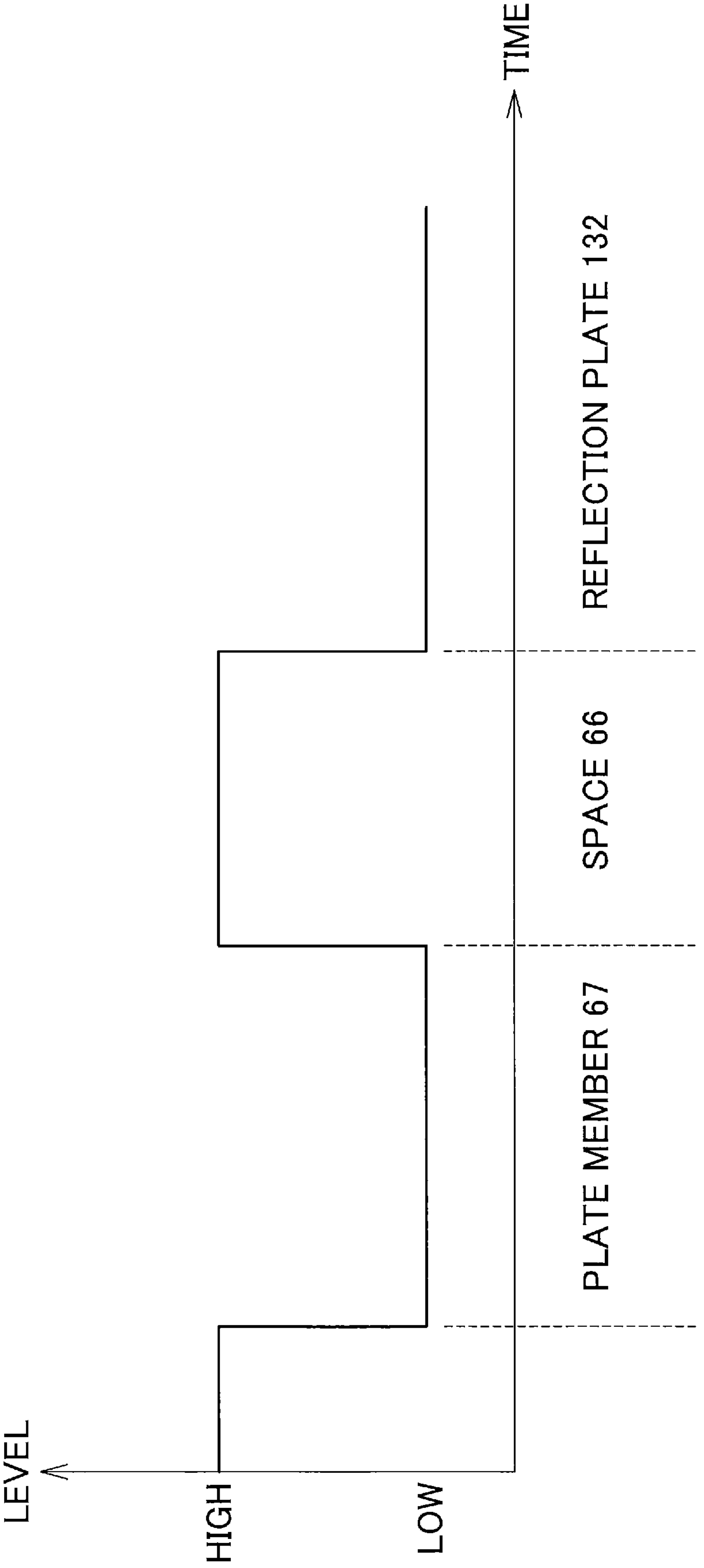

FIG. 12 is a graphical representation illustrating changes in signal outputted from the sensor 103 during an attachment of the ink cartridge 30 to the cartridge receiving portion 110.

Figure 13:
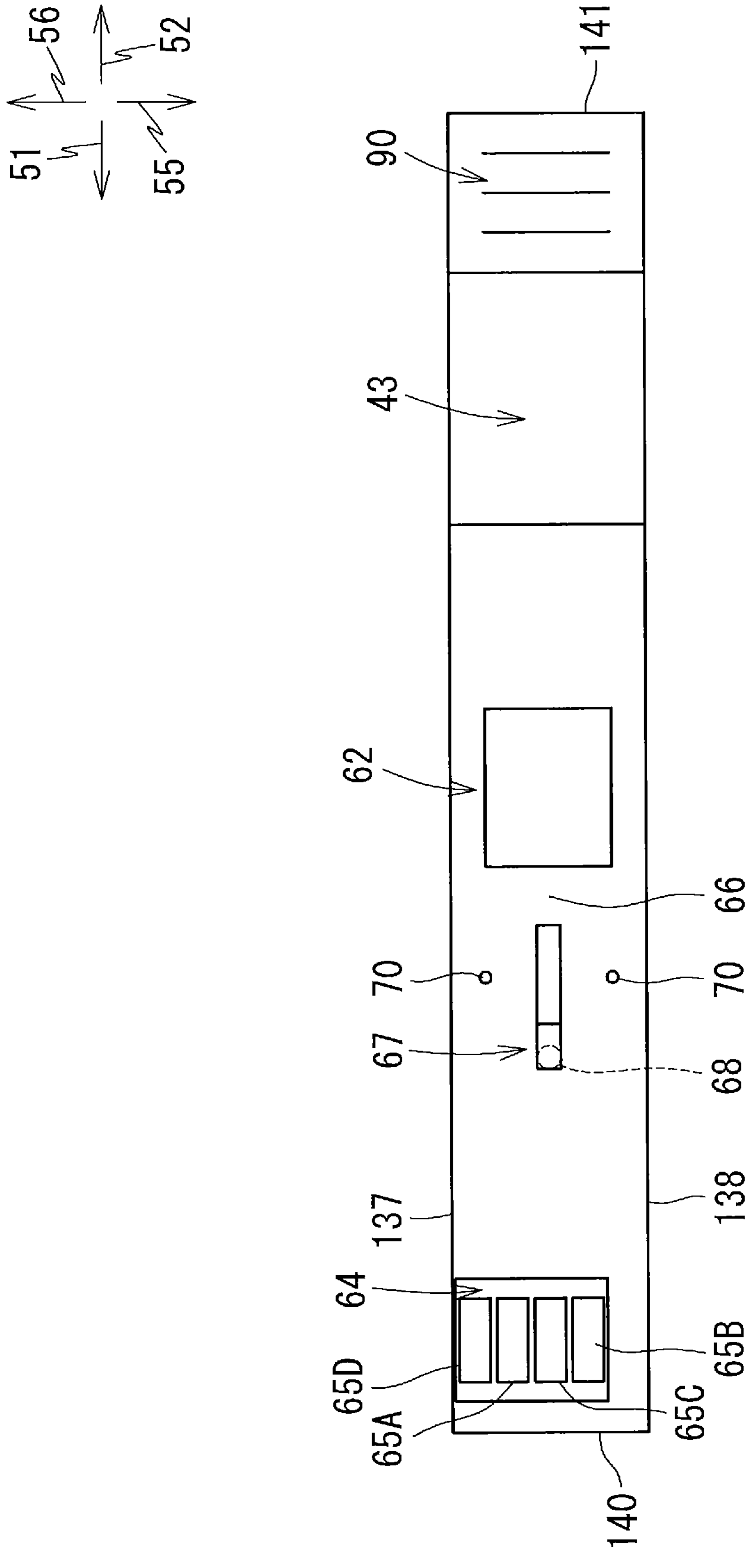

FIG. 13 is a plan view of an ink cartridge according to a modification in which the ink cartridge further includes a dummy electrode 65D.

Figure 14:
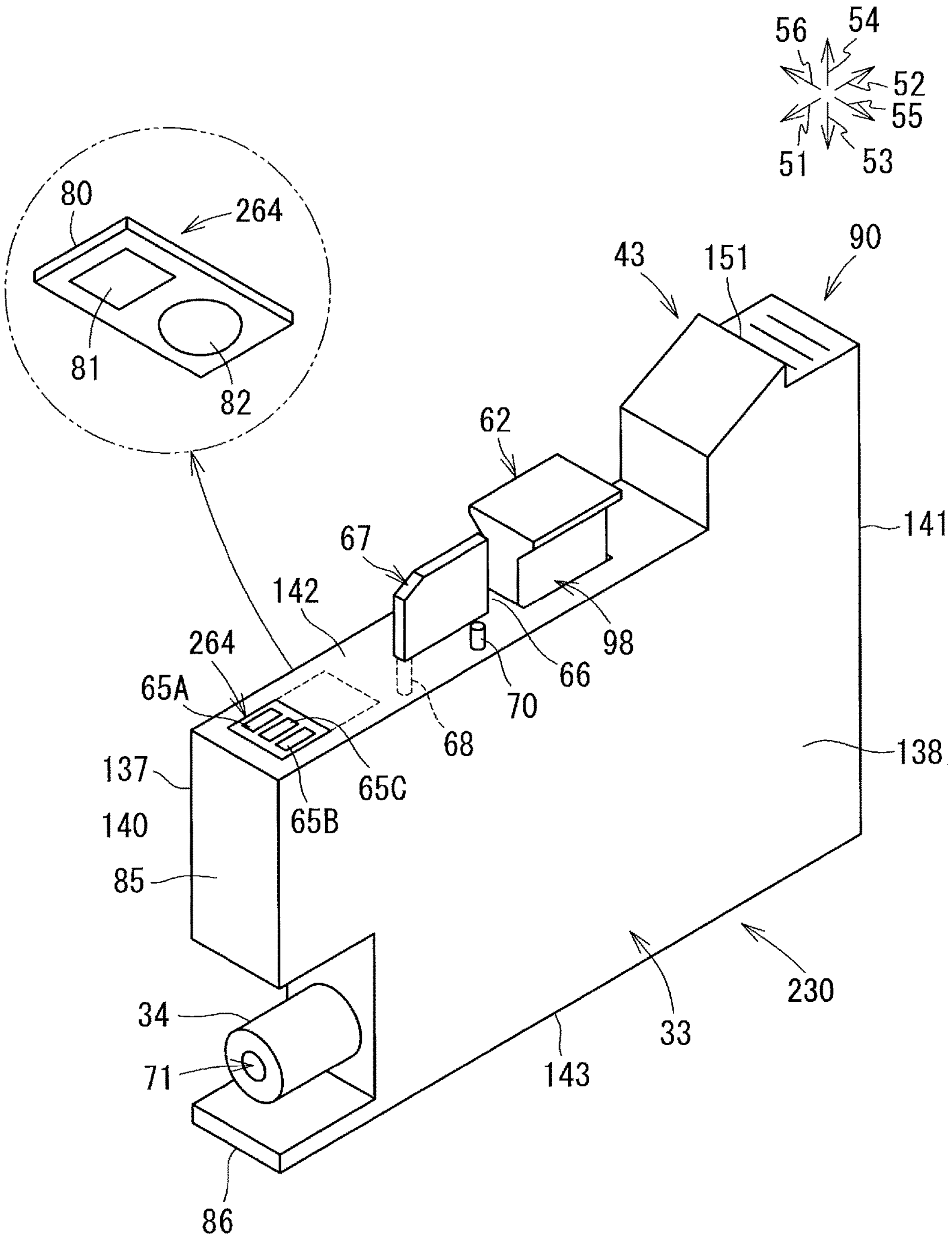

FIG. 14 is a perspective view of an ink cartridge 230 according to still another modification in which the ink cartridge 230 includes a modified IC circuit board 264.

Figure 15A:
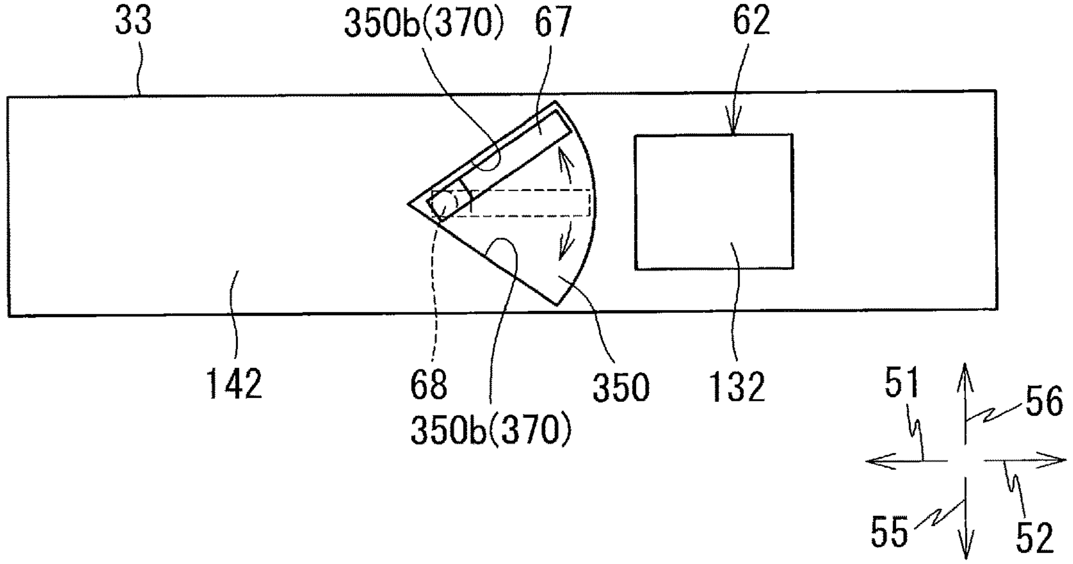

FIG. 15A is a plan view of an ink cartridge according to still another modification in which the ink cartridge includes a modified restricting portion 370.

Figure 15B:
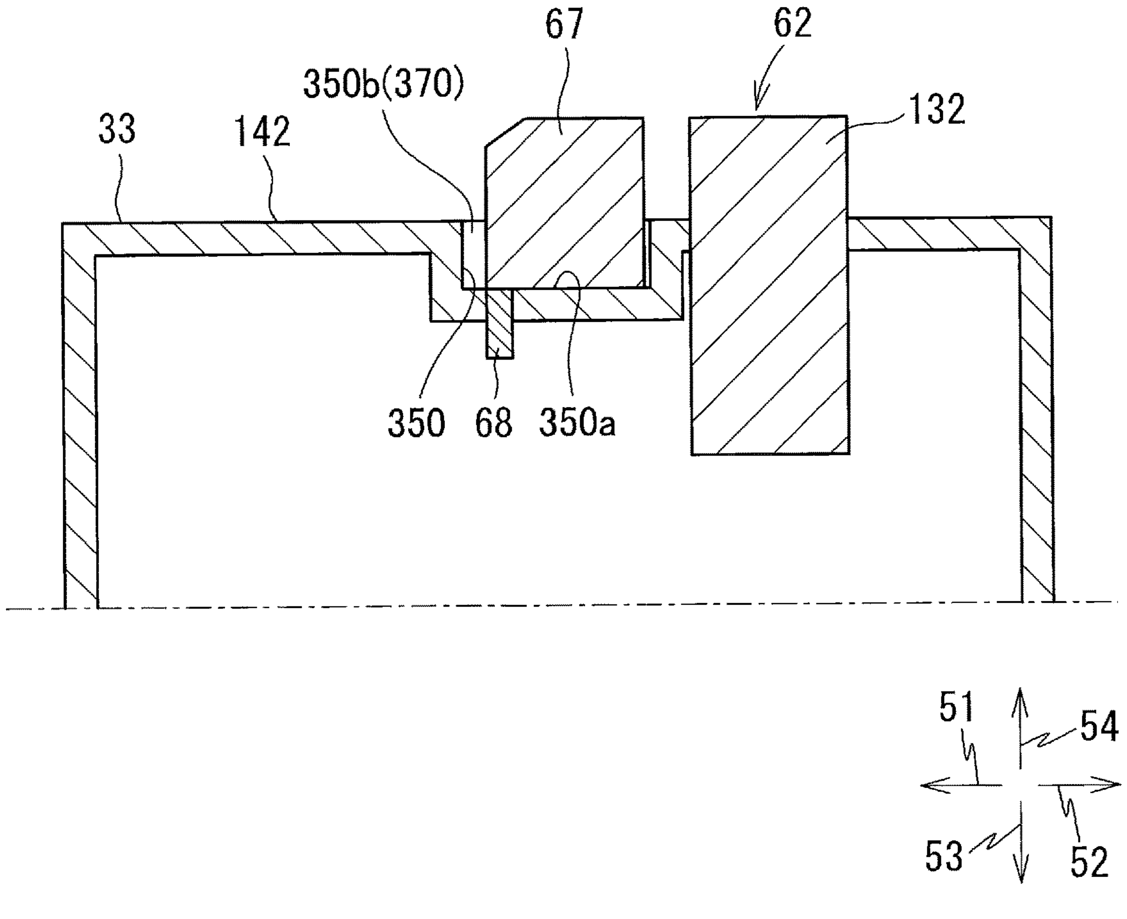

FIG. 15B is a vertical cross-sectional view of the ink cartridge of FIG. 15A in which the plate member 67 is in its first position.

Figure 16:
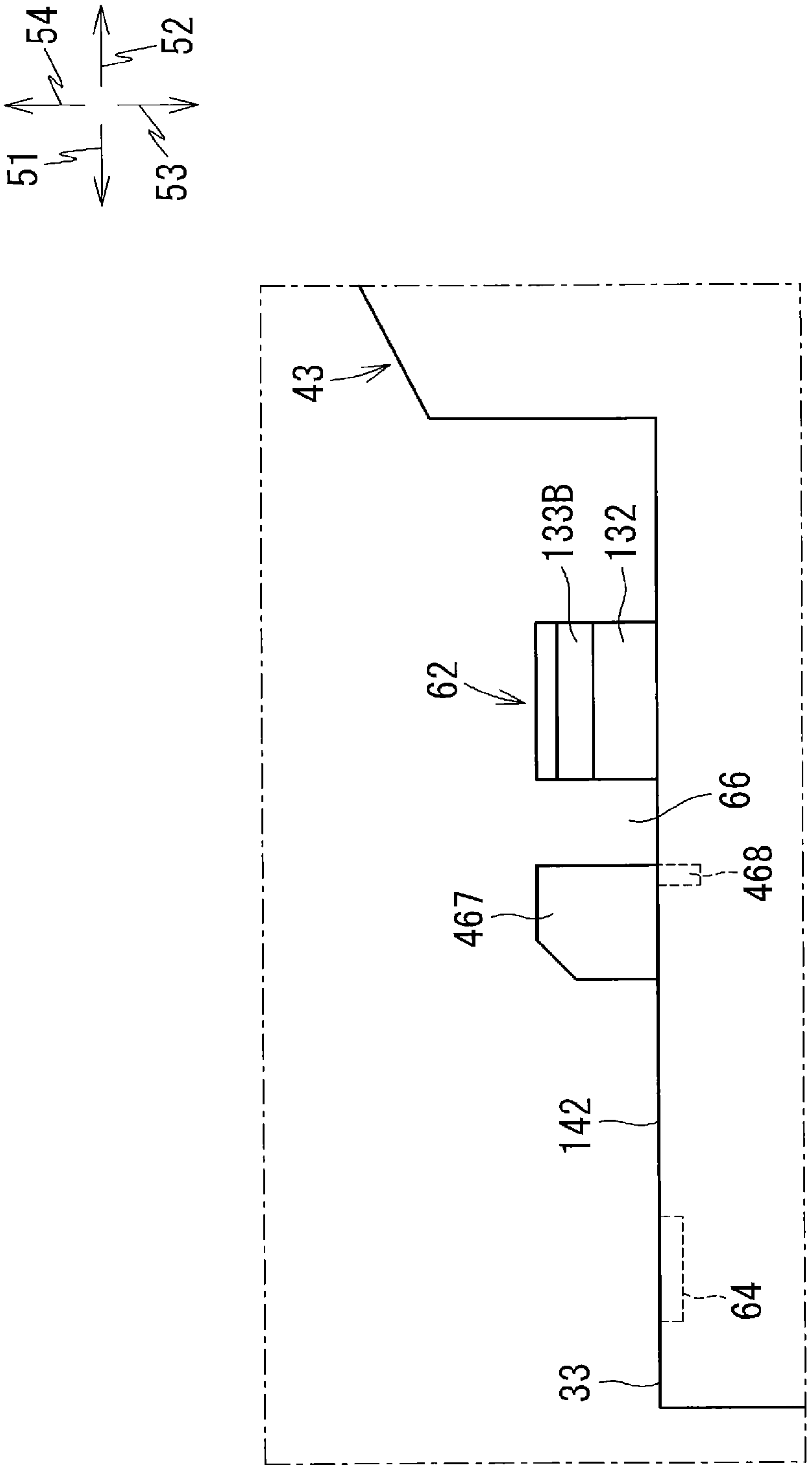

FIG. 16 is a partially enlarged right side view of an ink cartridge including a plate member 467 according to still another modification, in which a pivot shaft 468 is fixed to a lower-rear end of the plate member 467.

Figure 17A:
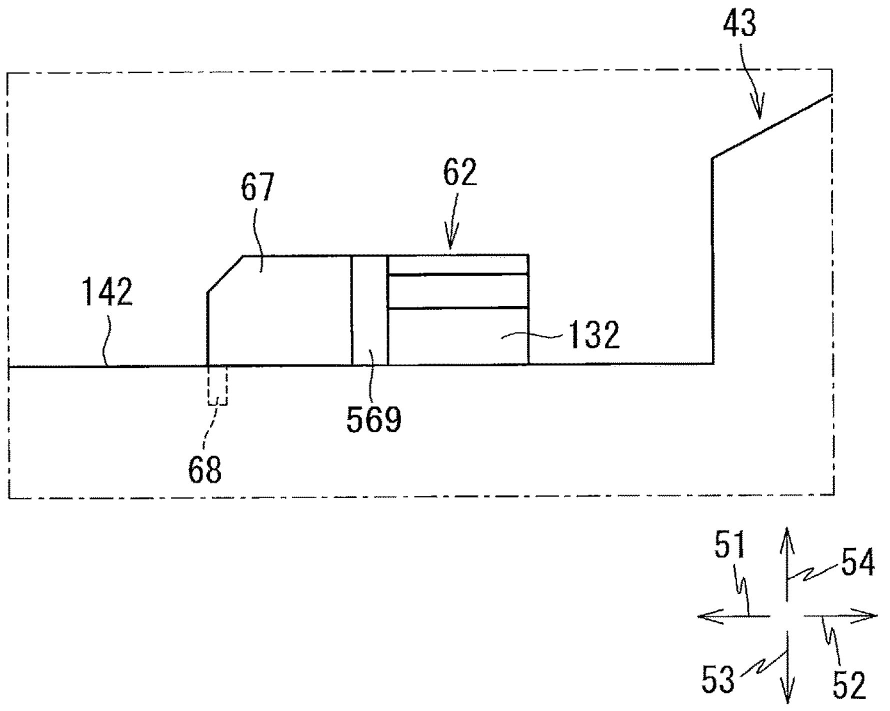

FIG. 17A is a partially enlarged right side view of an ink cartridge according to still another modification in which a light-transmissive member 569 is provided rearward of the plate member 67 so as to be integral therewith.

Figure 17B:
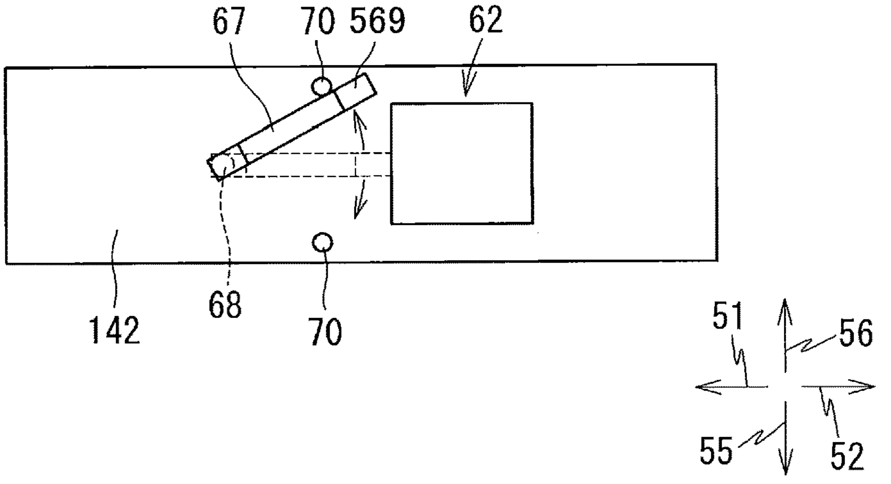

FIG. 17B is a plan view of the ink cartridge of FIG. 17A and particularly illustrating a region near the plate member 67 which is pivoted together with the light-transmissive member 569.

Figure 17C:
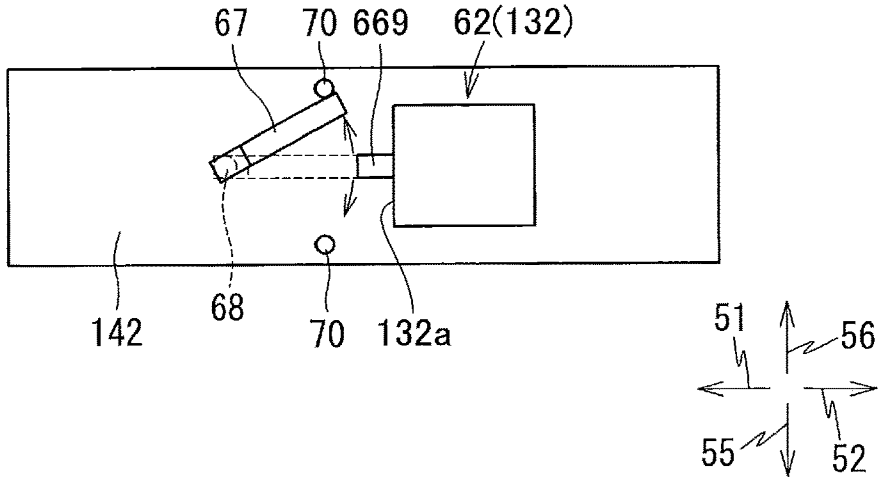

FIG. 17C is a plan view of an ink cartridge according to still another modification and particularly illustrating a region where near the plate member 67 and a light-transmissive member 669 provided integrally with the counter-detecting portion 62.

Figure 18A:
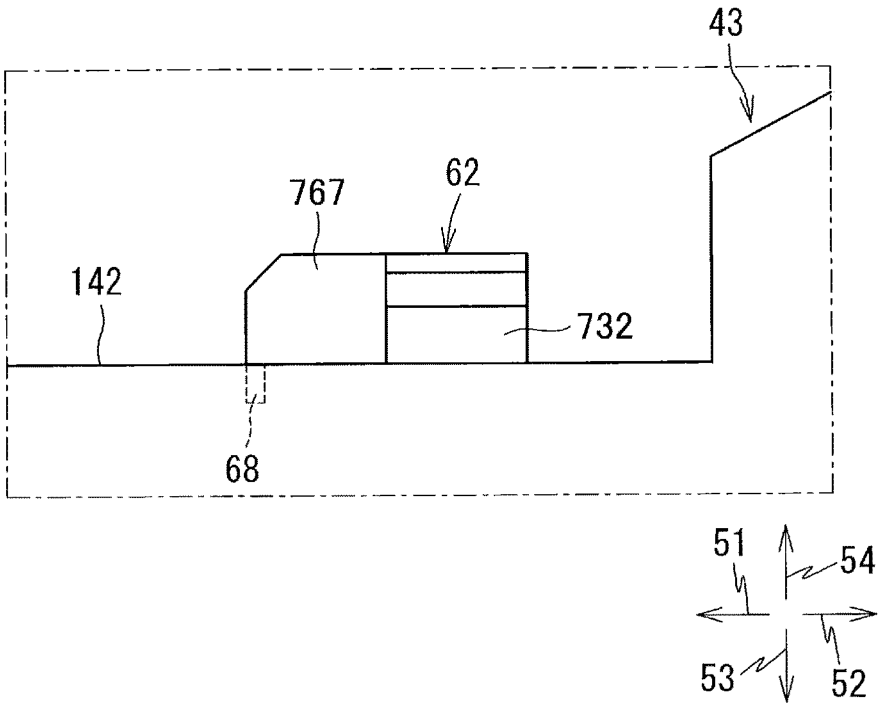

FIG. 18A is a partially enlarged right side view of an ink cartridge according to still another medication in which a light-transmissive region is not formed between a plate member 767 and a counter-detecting portion 762.

Figure 18B:
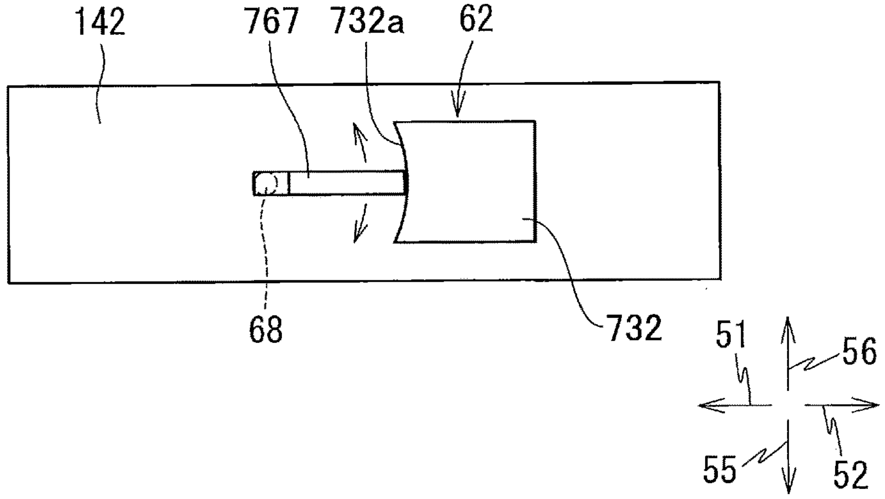

FIG. 18B is a plan view of the ink cartridge of FIG. 18A and particularly illustrating a region near the plate member 767 and the counter-detecting portion 762.

Figure 18C:
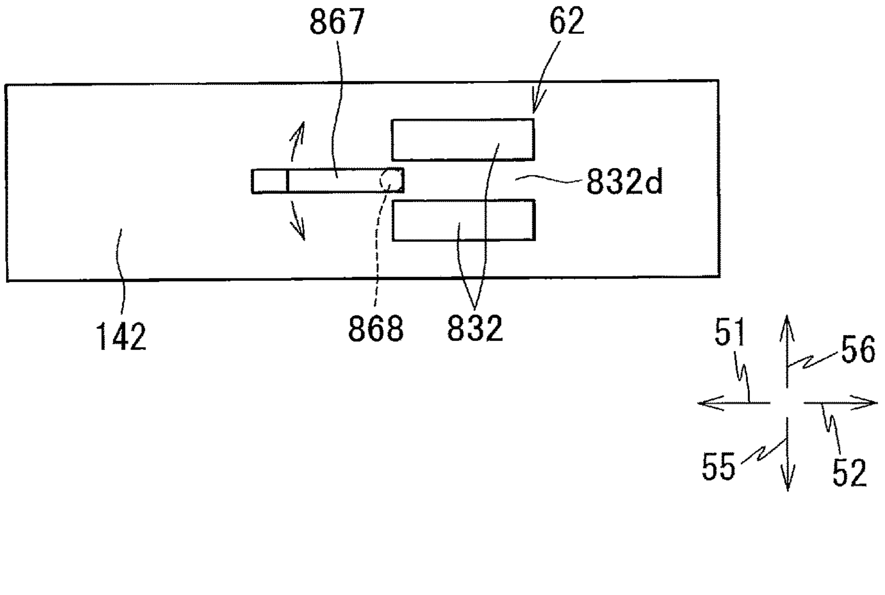

FIG. 18C is a plan view of an ink cartridge according to still another modification and particularly illustrating a region near a plate member 867 and a light-transmissive member 869.

Hereinafter, one embodiment of the present disclosure will be described with reference to the accompanying drawings. Incidentally, the embodiment described below is merely an example of the present disclosure, and it would be apparent to those skilled in the art that various modifications and variations may be made thereto without departing from the gist of the disclosure.

In the following description, the direction for insertion of an ink cartridge 30 into a cartridge receiving portion 110 will be defined as a frontward direction 51. The direction opposite to the frontward direction 51 will be defined as a rearward direction 52. That is, the rearward direction 52 is coincident with the direction for removal of the ink cartridge 30 from the cartridge receiving portion 110. In the present embodiment, the frontward direction 51 and the rearward direction 52 are both horizontal and perpendicular to the gravitational direction. However, the frontward direction 51 and the rearward direction 52 may not be horizontal. Further, in the following description, the gravitational direction will be defined as a downward direction 53, and the direction opposite to the downward direction 53 will be defined as an upward direction 54. Further, those directions perpendicular to both the frontward direction 51 and the downward direction 53 will be defined as a rightward direction 55 and a leftward direction 56. Specifically, in a state where the ink cartridge 30 has been inserted in the cartridge receiving portion 110 to assume an attached position, that is, in a state where the ink cartridge 30 is in an attached posture (attached state), the rightward direction 55 is a direction toward the right and the leftward direction 56 is a direction toward the left when the ink cartridge 30 is viewed from its front side.

Further, whenever appropriate, the frontward direction 51 and the rearward direction 52 will be collectively referred to simply as a front-rear direction 51/52. Likewise, the upward direction 54 and the downward direction 53 will be collectively referred to as an up-down direction 53/54, and the rightward direction 55 and the leftward direction 56 will be collectively referred to as a left-right direction 55/56.

Further, throughout the description, “facing frontward” implies facing in a direction that includes a frontward component, “facing rearward” implies facing in a direction that includes a rearward component, “facing downward” implies facing in a direction that includes a downward component, and “facing upward” implies facing in a direction that includes an upward component. For example, “a front surface faces frontward” may imply not only that the front surface faces frontward, but also that the front surface faces in a direction slanted relative to the frontward direction.

<Outline of Printer 10>

Figure 1:
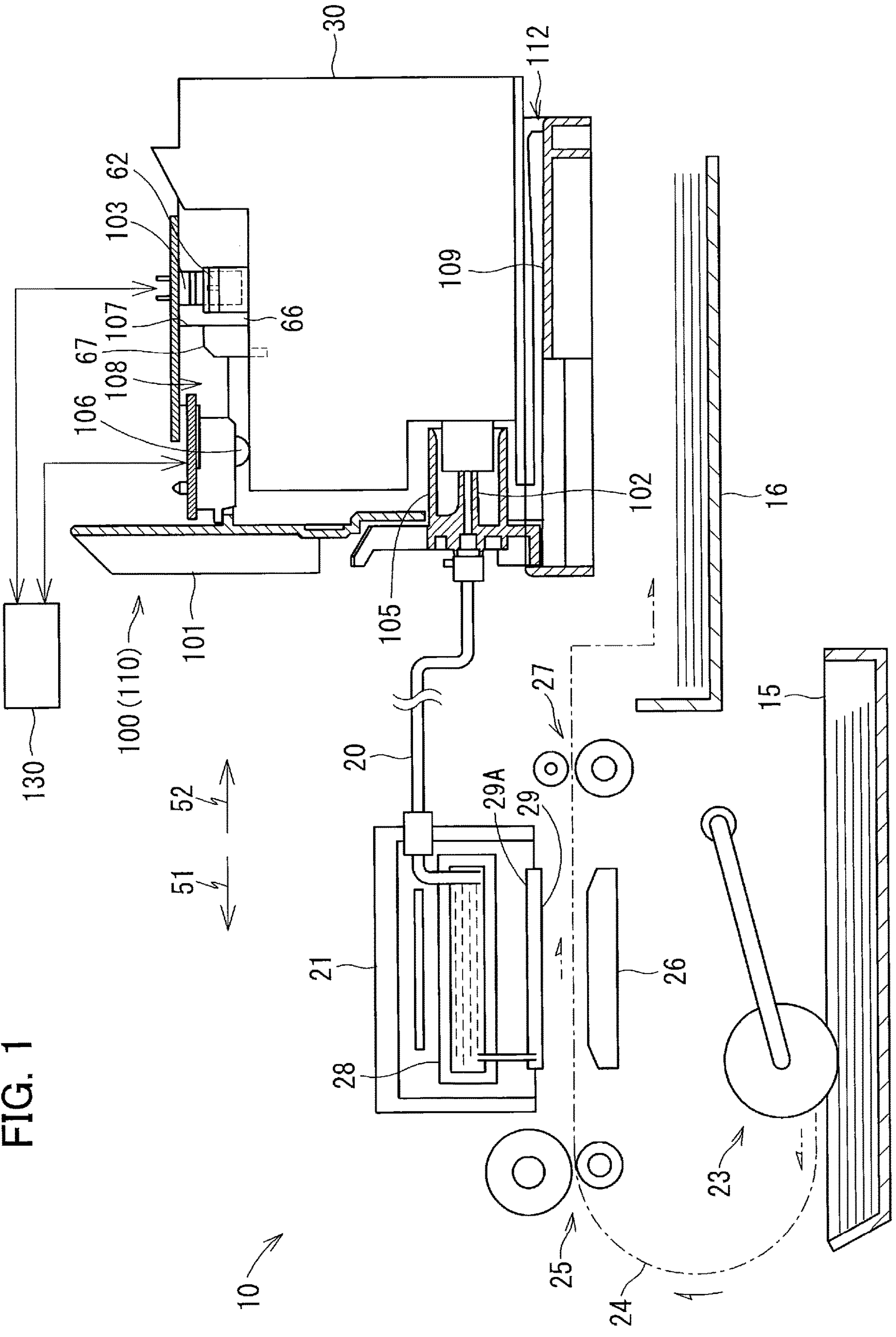
FIG. 1 is a schematic cross-sectional view schematically illustrating an internal structure of a printer 10 incorporating a cartridge receiving portion 110.

As illustrated in FIG. 1, a printer 10 is configured to selectively discharge ink droplets onto a recording sheet to record an image thereon according to an inkjet recording scheme. The printer 10 includes a recording head 21, an ink supplying device 100, and tubes 20 connecting the ink supplying device 100 to the recording head 21. The ink supplying device 100 includes the cartridge receiving portion 110. The ink cartridge 30 is configured to be attached to the cartridge receiving portion 110. The cartridge receiving portion 110 has one end face formed with an opening 112. The ink cartridge 30 is configured to be inserted frontward into the cartridge receiving portion 110 through the opening 112, and the ink cartridge 30 is configured to be removed rearward from the cartridge receiving portion 110 through the opening 112.

The ink cartridge 30 stores therein ink that can be used in the printer 10. Upon completion of the attachment of the ink cartridge 30 to the cartridge receiving portion 110, the ink cartridge 30 and the recording head 21 are connected to each other through the corresponding tube 20. The recording head 21 includes a sub-tank 28. The sub-tank 28 is configured to temporarily store the ink supplied through the tube 20. The recording head 21 is configured to eject the ink supplied from the sub tank 28 through the selective nozzles 29 according to the inkjet recording scheme.

Specifically, a head control board (not illustrated) is provided in the recording head 21. The head control board is configured to selectively apply driving voltages to piezoelectric elements 29A each being provided for each nozzle 29 to eject ink through the selected nozzle 29. Specifically, a head control board (not illustrated) is provided in the recoding head 21. The head control board is configured to selectively apply drive voltages to piezoelectric elements 29A each provided for a corresponding one of the nozzles 29 to eject ink through the selected nozzles 29. That is, the recording head 21 is configured to consume the ink stored in the ink cartridge 30 that is attached to the cartridge receiving portion 110.

The printer 10 includes a sheet supply tray 15, a sheet pick-up roller 23, a sheet conveying passage 24, a pair of conveying rollers 25, a platen 26, a pair of discharge rollers 27, and a sheet discharge tray 16. A recording sheet is fed from the sheet supply tray 15 to the sheet conveying passage 24 by the sheet pick-up roller 23, and is then conveyed onto the platen 26 by the pair of conveying rollers 25. The recording head 21 selectively ejects ink onto the recording sheet while the recording sheet moves over the platen 26, thereby recording an image on the recording sheet. The recording sheet having passed through the platen 26 is finally discharged by the pair of discharge rollers 27 onto the sheet discharge tray 16 positioned at a most downstream end in the conveying passage 24.

<Ink Supplying Device 100>

As illustrated in FIG. 1, the ink supplying device 100 is provided in the printer 10. The ink supplying device 100 is configured to supply ink to the recording head 21 provided in the printer 10. The ink supplying device 100 includes the cartridge receiving portion 110 to which the ink cartridge 30 is attachable. Incidentally, FIG. 1 illustrates a state where the attachment of the ink cartridge 30 to the cartridge receiving portion 110 is complete. That is, FIG. 1 illustrates the attached state of the ink cartridge 30 to the cartridge receiving portion 110.

<Cartridge Receiving Portion 110>

Figure 2:
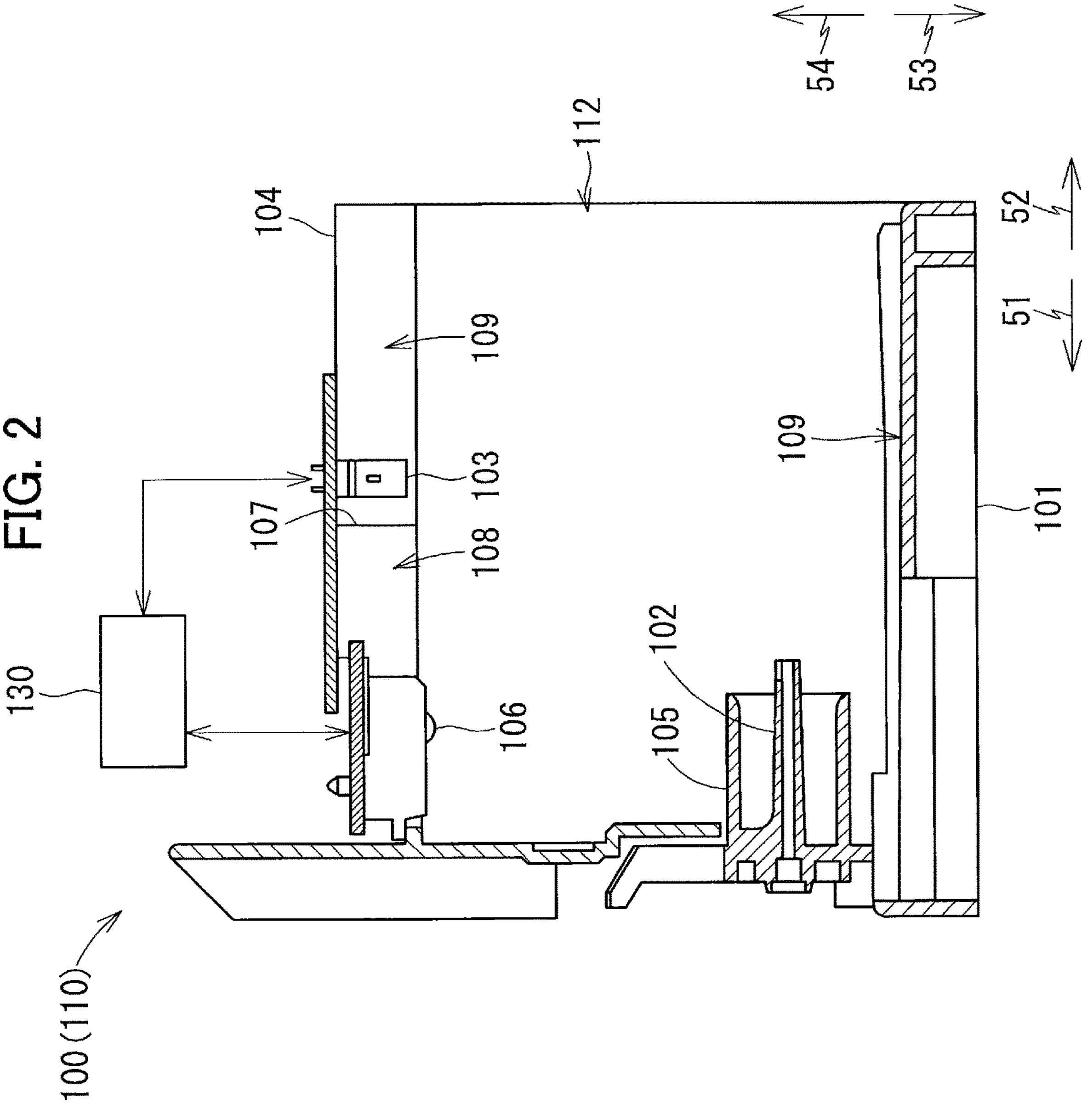
FIG. 2 is a cross-sectional view illustrating a structure of the cartridge receiving portion 110.

As illustrated in FIG. 2, the cartridge receiving portion 110 includes a casing 101, an ink needle 102, a sensor 103, and three contacts 106. Indeed, the cartridge receiving portion 110 is configured to accommodate therein four ink cartridges 30 corresponding to the colors of cyan, magenta, yellow, and black. Accordingly, four sets of the ink needle 102, the sensor 103, and the three contacts 106 are provided in the cartridge receiving portion 110, each set for each one of the four ink cartridges 30. Incidentally, the casing 101 includes a locking portion (not illustrated) for maintaining the ink cartridge 30 in the attached state relative to the cartridge receiving portion 110.

<Casing 101>

As illustrated in FIG. 2, the casing 101 constitutes a housing of the cartridge receiving portion 110. The casing 101 has a box-like shape and defines an internal space therein. The internal space is defined by a top surface constituting a top of the internal space, a bottom surface constituting a bottom of the internal space, an end surface connecting the top surface to the bottom surface, and the opening 112 facing the end surface in the front-rear direction 51/52. The opening 112 can be exposed to a user interface surface of the printer 10 which is a surface that a user faces when using the printer 10.

The ink cartridges 30 are configured to be inserted into and removed from the casing 101 through the opening 112. Each of the top surface and the bottom surface is formed with four guide grooves 109 extending in the front-rear direction 51/52. Upper and lower end portions of each ink cartridge 30 are inserted into the corresponding guide grooves 109 and guided thereby in the front-rear direction 51/52 to be received in the casing 101. Three plates 104 are also provided in the casing 101 to partition the internal space of the casing 101 into four chambers each elongated in the up-down direction 53/54. The four ink cartridges 30 are configured to be accommodated each in a corresponding one of the four chambers in the casing 101.

<Ink Needle 102>

As illustrated in FIG. 2, each ink needle 102 is in a tubular shape and made of resin. The ink needle 102 is positioned at a lower portion of the end surface of the casing 101. Each ink needle 102 is at such a position matching to an ink supply portion 34 (see FIG. 3) of the corresponding ink cartridge 30 attached to the cartridge receiving portion 110. The ink needle 102 protrudes rearward from the end surface of the casing 101.

A hollow cylindrical guide portion 105 is provided to surround each of the ink needles 102. Each guide portion 105 protrudes rearward from the end surface of the casing 101, and has a protruding end that is open rearward. Each ink needle 102 is positioned at a diametrical center of the corresponding guide portion 105. Each guide portion 105 is so shaped to allow the corresponding ink supply portion 34 to be received in the guide portions 105.

In a process that the ink cartridge 30 is inserted frontward into the cartridge receiving portion 110, that is, in the process for moving the ink cartridge 30 into the attached position, the ink supply portion 34 is entered in the corresponding guide portion 105 (see FIG. 1). As the ink cartridge 30 is inserted further frontward into the cartridge receiving portion 110, the ink needle 102 is inserted into an ink supply opening 71 of the corresponding ink supply portion 34. In this way, the ink needle 102 is fluidly connected to the ink supply portion 34, and the ink supply portion 34 is fixed in position relative to the cartridge receiving portion 110. Accordingly, the ink stored in a storage chamber 36 formed inside the ink cartridge 30 can flow into the corresponding tube 20 connected to the ink needle 102 through internal spaces of the ink supply portion 34 and ink needle 102. Incidentally, the ink needle 102 may have a flat tip end or a pointed tip end.

<Contacts 106>

The three contacts 106 are provided at the top surface of the casing 101 at a position near the end surface, while only one contact 106 is depicted in FIG. 2. The three contacts 106 are arrayed in the left-right direction 55/56 with an interval between the neighboring contacts 106. The layout of the three contacts 106 corresponds to the layout of three electrodes constituting an electrode group 65 of the ink cartridge 30 (namely, a power source electrode 65A, a signal electrode 65B, and a ground electrode 65C) as will be described later (see FIG. 3). Each contact 106 is electrically conductive and is resiliently deformable in the up-down direction 53/54. As explained above, four sets of the three contacts 106 corresponding to the four ink cartridges 30 attachable to the casing 101 are provided at the casing 101.

Each contact 106 is electrically connected to a controller 130 (see FIG. 1) through an electrical circuit. The controller 130 includes a CPU, a ROM, a RAM and the like, and may be configured as a controller for the printer 10. When the contacts 106 are electrically connected to the electrode group 65, a voltage Vc is applied to the power source electrode 65A, reading/writing of signals is performed through the signal electrode 65B, and the ground electrode 65C is grounded. Upon establishment of the electrical conduction between the contact 106 and the signal electrode 65B, the controller 130 can access data stored in an IC (not illustrated) on an IC circuit board 64 (see FIG. 3, described later) of the ink cartridge 30 through the electrical circuit.

<Sensor 103>

As illustrated in FIG. 2, the sensor 103 is provided at the top surface of the casing 101. The sensor 103 includes a light emitting portion and a light receiving portion. The light emitting portion and the light receiving portion are arranged to be spaced apart from each other in the left-right direction 55/56. Upon completion of the attachment of the ink cartridge 30 to the cartridge receiving portion 110, a counter-detecting portion 62 (see FIG. 3) of the ink cartridge 30 is positioned between the light emitting portion and the light receiving portion. In other words, the light emitting portion and the light receiving portion face each other with the counter-detecting portion 62 interposed therebetween in the state where the attachment of the ink cartridge 30 to the cartridge receiving portion 110 is complete.

The sensor 103 is configured to output different detection signals depending on whether or not light emitted from the light emitting portion is received by the light receiving portion. For example, the sensor 103 may output a low-level signal (i.e., a signal whose level is lower than a threshold level) in a case where the light receiving portion cannot receive the light emitted from the light emitting portion (that is, when an intensity of the light received at the light-receiving portion is less than a predetermined intensity). On the other hand, the sensor 103 may output a high-level signal (i.e., a signal whose signal level is equal to or higher than the threshold level) in a case where the light receiving portion can receive the light emitted from the light emitting portion (that is, when the intensity of the received light is equal to or greater than the predetermined intensity). The signal outputted from the sensor 103 is configured to be inputted into the controller 130.

As illustrated in FIG. 2, the top surface of the casing 101 is formed with four slits 108 each positioned rearward of the corresponding three contacts 106 and frontward of the corresponding sensor 103. Into each of the slits 80, a plate member 67 of the corresponding ink cartridge 30 (see FIG. 3) can be entered. Each slit 108 has a width in the left-right direction 55/56 smaller than a width in the left-right direction 55/56 of the corresponding guide groove 109. Further, a wall surface 107 facing rearward is positioned at a boundary between each guide groove 109 and each slit 108. Each slit 108 is open at a center of the wall surface 107 in the left-right direction 55/56.

<Ink Cartridge 30>

Figure 3:
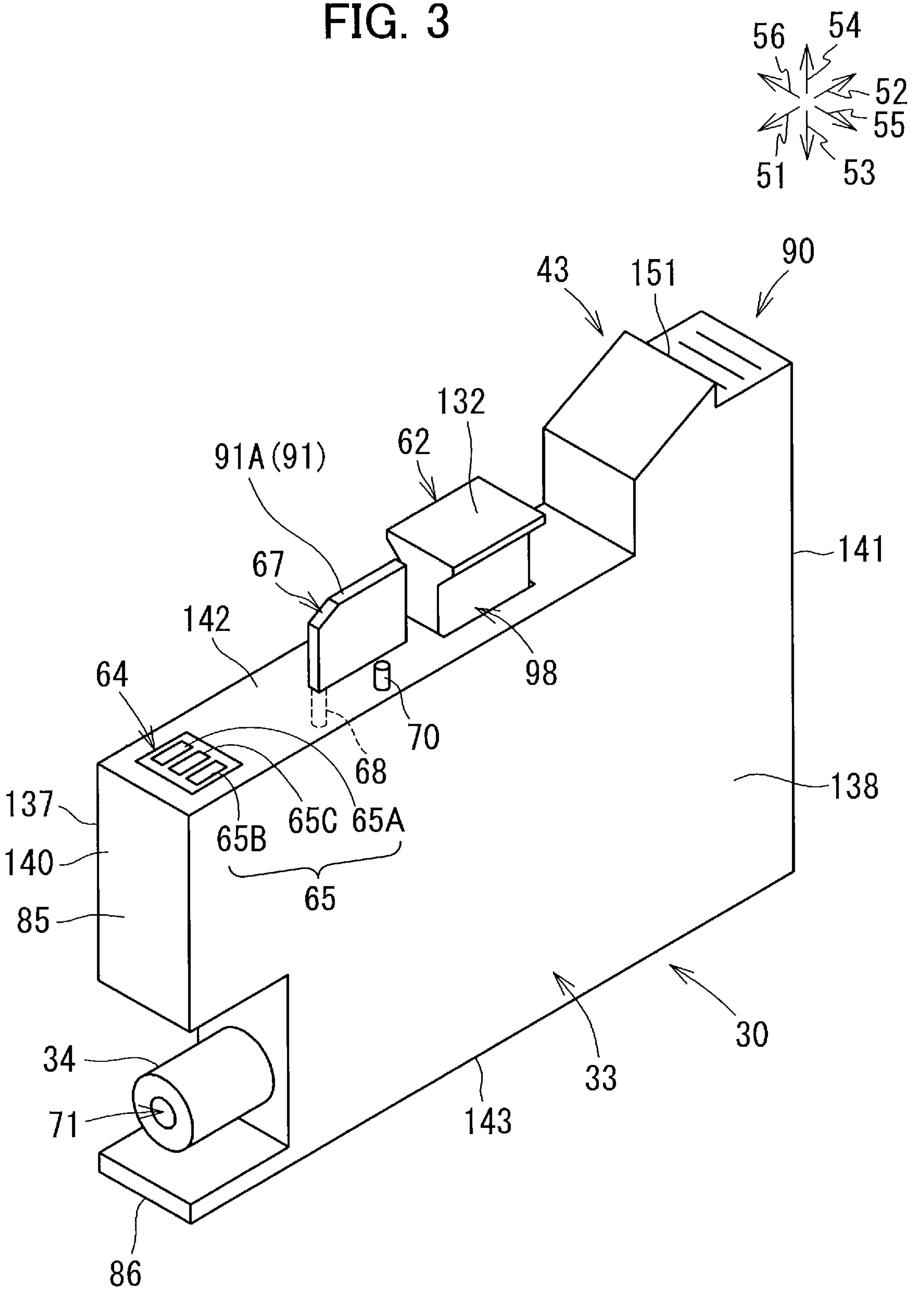
FIG. 3 is a perspective view illustrating an external structure of an ink cartridge 30 according to one embodiment.

The ink cartridge 30 illustrated in FIG. 3 is a container for storing ink therein. The storage chamber 36 and a sub-storage chamber 37 are provided inside the ink cartridge 30, as illustrated in FIGS. 4A and 4B. The ink cartridge 30 includes a cartridge case 33 forming an outer shell of the ink cartridge 30, and an internal frame 35 accommodated in the cartridge case 33. The storage chamber 36 and the sub-storage chamber 37 are defined by an internal space of the internal frame 35. Alternatively, these chambers 36, 37 may be defined by an internal space of the cartridge case 33 alone.

The ink cartridge 30 illustrated in FIG. 3 is in the attached posture. The ink cartridge 30 has a front surface 140, a rear surface 141, an upper surface 142, a lower surface 143, a left side surface 137, and a right side surface 138. In the attached posture of the ink cartridge 30 illustrated in FIG. 3, a direction from the rear surface 141 to the front surface 140 is coincident with the frontward direction 51, a direction from the front surface 140 to the rear surface 141 is coincident with the rearward direction 52, a direction from the upper surface 142 to the lower surface 143 is coincident with the downward direction 53, a direction from the lower surface 143 to the upper surface 142 is coincident with the upward direction 54, a direction from the left side surface 137 to the right side surface 138 is coincident with the rightward direction 55, and a direction from the right side surface 138 to the left side surface 137 is coincident with the leftward direction 56. Further, in the process for inserting the ink cartridge 30 into the cartridge receiving portion 110, the front surface 140 faces frontward, the rear surface 141 faces rearward, the lower surface 143 faces downward, the upper surface 142 faces upward, the left side surface 137 faces leftward, and the right side surface 138 faces rightward.

Incidentally, each of the front surface, the rear surface, the upper surface, the lower surface, and the side surfaces of the ink cartridge 30 need not be configured as one flat plane. That is, the front surface of the ink cartridge 30 can be any surface(s) that can be seen when the ink cartridge 30 in its attached posture is viewed from its front side, and that is(are) positioned frontward relative to a center of the ink cartridge 30 in the front-rear direction 51/52. The rear surface of the ink cartridge 30 can be any surface(s) that can be seen when the ink cartridge 30 in its attached posture is viewed from its rear side, and that is(are) positioned rearward relative to the center of the ink cartridge 30 in the front-rear direction 51/52. The upper surface of the ink cartridge 30 can be any surface(s) that can be seen when the ink cartridge 30 in its attached posture is viewed from above, and that is(are) positioned upward relative to a center of the ink cartridge 30 in the up-down direction 53/54. The lower surface of the ink cartridge 30 can be any surface(s) that can be seen when the ink cartridge 30 in its attached posture is viewed from below, and that is(are) positioned downward relative to the center of the ink cartridge 30 in the up-down direction 53/54. The same is applied to the side surfaces of the ink cartridge 30.

The ink cartridge 30 has a generally flat shape having a width in the left-right direction 55/56, a height in the up-down direction 53/54, and a depth in the front-rear direction 51/52, the width being smaller than the height and the depth. The front surface 140 of the cartridge case 33 faces frontward and the rear surface 141 of the cartridge case 33 faces rearward while the ink cartridge 30 is inserted in the cartridge receiving portion 110. The front surface 140 and the rear surface 141 are arranged with the storage chamber 36 interposed therebetween.

As illustrated in FIG. 3, a protruding portion 43 and an operating portion 90 are provided on the upper surface 142 of the cartridge case 33. The protruding portion 43 extends in the front-rear direction 51/52 and has a center in the left-right direction 55/56 coincident with the center of the upper surface 142 in the left-right direction 55/56. The protruding portion 43 has a locking surface 151 facing rearward. The locking surface 151 extends in the up-down direction 53/54 and the left-right direction 55/56. The locking surface 151 facing rearward is configured to contact the locking portion (not illustrated) of the cartridge receiving portion 110) from frontward thereof in the attached state of the ink cartridge 30 to the cartridge receiving portion 110. This contact of the locking surface 151 with the locking portion can hold the ink cartridge 30 in the attached state relative to the cartridge receiving portion 110. The operating portion 90 is positioned rearward of the locking surface 151 in the front-rear direction 51/52.

The locking portion may have any configuration, provided that the locking portion can contact the locking surface 151 of the ink cartridge 30 to hold the ink cartridge 30 in the attached posture. For example, the locking portion may be configured as a rod-like member provided on the top surface of the casing 101 near the opening 112 and extending in the left-right direction 55/56. The locking portion is configured to hold the ink cartridge 30 in the attached posture against an urging force of a coil spring (not illustrated) provided in the ink supply portion 34 for urging a valve to close the ink supply opening 71. Incidentally, the ink cartridge 30 may be attached to the cartridge receiving portion 110 in such a posture tilted relative to the attached posture (i.e., need not be in the attached posture), as long as the contact between the locking portion and the locking surface 151 can keep the ink cartridge 30 attached to the cartridge receiving portion 110.

The front surface 140 of the cartridge case 33 is formed with a first protruding portion 85 and a second protruding portion 86. The first protruding portion 85 is positioned on an upper end portion of the cartridge case 33 and protrudes frontward. The first protruding portion 85 has a protruding end surface that constitutes a part of the front surface 140.

The second protruding portion 86 is positioned at a lower end portion of the cartridge case 33, i.e., below the ink supply portion 34, and protrudes frontward from the lower end portion of the cartridge case 33. The second protruding portion 86 has a protruding end face positioned frontward of the front end (ink supply opening 71) of the ink supply portion 34.

A hole 98 is open at the upper surface 142 of the cartridge case 33. The hole 98 penetrates through an upper wall of the cartridge case 33 vertically (see FIGS. 4A and 4B). The counter-detecting portion 62 extends vertically through the hole 98 to be exposed to an outside of the cartridge case 33.

As illustrated in FIGS. 4A and 4B, the counter-detecting portion 62 includes a prism 131 and a reflection plate 132. The reflection plate 132 is arranged to be positioned between the light emitting portion and the light receiving portion of the sensor 103 when the ink cartridge 30 is attached to the cartridge receiving portion 110.

The reflection plate 132 is supported by the internal frame 35, and extends upward through the hole 98 of the cartridge case 33 up to a position above the upper surface 142. The reflection plate 132 has a pair of first reflection surface 133A and a second reflection surface 133B both of which are slanted by 45 degrees with respect to the left-right direction 55/56. The first reflection surface 133A can reflect the light emitted from the light emitting portion of the sensor 103 and traveling in the rightward direction 55 to redirect the light in the downward direction 53. The second reflection surface 133B can reflect the light traveling in the upward direction 54 from the prism 131 to redirect the light in the rightward direction 55 toward the light receiving portion.

The prism 131 is provided in the internal frame 35. The prism 131 has a first reflection surface 134A and a second reflection surface 134B. The first and second reflection surfaces 134A, 134B are designed to contact the ink stored in the sub-storage chamber 37. The prism 131 is made from, for example, synthetic resin having optical transparency. The sub-storage chamber 37 is positioned between the storage chamber 36 and the ink supply portion 34 in an ink flow path of the ink cartridge 30. The level of the ink stored in the sub-storage chamber 37 is designed to be lowered after all the ink stored in the storage chamber 36 flows out therefrom.

The prism 131 is positioned below the first reflection surface 133A and the second reflection surface 133B. The first reflection surface 134A of the prism 131 is positioned directly below the first reflection surface 133A of the reflection plate 132. The first reflection surface 134A faces diagonally leftward and downward and is inclined by 45 degrees with respect to the left-right direction 55/56. The second reflection surface 134B of the prism 131 is positioned directly below the second reflection surface 133B of the reflection plate 132. The second reflection surface 134B faces diagonally rightward and downward and is inclined by 45 degrees with respect to the left-right direction 55/56.

The first reflection surface 134A and the second reflection surface 134B of the prism 131 refract light in a state where the first reflection surface 134A and the second reflection surface 134B are in contact with the ink. On the other hand, the first reflection surface 134A and the second reflection surface 134B reflect light in a state where the first reflection surface 134A and the second reflection surface 134B are not in contact with the ink. That is, whether the prism 131 refracts or reflects the incident light is dependent on whether or not the reflection surfaces 134A, 134B are in contact with the ink stored in the sub-storage chamber 37. In other words, the reflection surfaces 134A, 134B of the prism 131 can change the traveling direction of the incident light depending on whether the reflection surfaces 134A, 134B are in contact with the ink or not.

As illustrated in FIG. 4A, in the state where the first and second reflection surfaces 134A, 134B of the prism 131 are in contact with the ink stored in the sub-storage chamber 37, the light emitted from the light emitting portion of the sensor 103 is reflected by the first reflection surface 133A of the reflection plate 132 downward toward the prism 131, and is then refracted by the first reflection surface 134A of the prism 131 to travel outside toward the sub-storage chamber 37. Hence, the sensor 103 outputs a low-level signal.

On the other hand, as illustrated in FIG. 4B, in the state where the level of the ink stored in the sub-storage chamber 37 is lowered below the first and second reflection surfaces 134A, 134B of the prism 131 so that the first and second reflection surfaces 134A, 134B no longer contact the ink, the light emitted from the light emitting portion of the sensor 103 is reflected by the first reflection surface 133A of the reflection plate 132 and is redirected toward the first reflection surface 134A of the prism 131. The light is then reflected at the first reflection surface 134A and is directed toward the second reflection surface 134B of the prism 131. The light is then reflected at the second reflection surface 134B and is directed upward toward the second reflection surface 133B of the reflection plate 132. The light is then reflected by the second reflection surface 133B and is directed rightward toward the light receiving portion of the sensor 103. As a result, the sensor 103 outputs a high-level signal. In this way, the sensor 103 can output different signals depending on whether the prism 131 is in contact with the ink in the sub-storage chamber 37. The controller 130 can thus determine whether the ink in the sub-storage chamber 37 is at the level of the prism 131 or lower based on the signal outputted from the sensor 103.

As illustrated in FIG. 3, the IC circuit board 64 is provided on the upper surface 142 of the cartridge case 33 and above the first protruding portion 85, that is, directly above the ink supply portion 34. The IC circuit board 64 can be electrically connected to the three contacts 106 (see FIG. 2) arrayed in the left-right direction 55/56 in the process for attaching the ink cartridge 30 to the cartridge receiving portion 110. The IC circuit board 64 is electrically connected to the three contacts 106 of the cartridge receiving portion 110 in the attached state of the ink cartridge 30 to the cartridge receiving portion 110.

The IC circuit board 64 includes a rigid board made from glass epoxy, the IC (not illustrated), and the electrode group 65. The IC and the electrode group 65 are surface-mounted on the rigid board. The IC is a semiconductor integrated circuit, and stores therein readable/writable data indicative of information on the ink cartridge 30 such as a lot number, a date of manufacture, and the color of ink.

The electrode group 65 is mounted on the upper surface of the rigid board and is exposed thereon so as to be accessible. The electrode group 65 is electrically connected to the IC. The electrode group 65 is also electrically connectable to a power source (not illustrated) of the printer 10 when the ink cartridge 30 is attached to the cartridge receiving portion 110. Alternatively, in a case where the ink cartridge 30 includes a battery as a power source, the electrode group 65 may be electrically connected to the battery for receiving power therefrom.

As illustrated in FIG. 3, the electrode group 65 includes the power source electrode 65A, the signal electrode 65B, and the ground electrode 65C. The power source electrode 65A, the signal electrode 65B, and the ground electrode 65C respectively extend in the front-rear direction 51/52, and are arrayed to be spaced apart from each other in the left-right direction 55/56. Specifically, the ground electrode 65C is positioned at the center of the upper surface 142 in the left-right direction 55/56. The power source electrode 65A is positioned rightward of the ground electrode 65C, and the signal electrode 65B is positioned leftward of the ground electrode 65C in the left-right direction 55/56. Alternatively, the positions of the power source electrode 65A and the signal electrode 65B may be interchanged with each other. The power source electrode 65A and the signal electrode 65B are electrically connected to each other.

As illustrated in FIG. 3, the ink supply portion 34 protrudes frontward from the lower end portion of the front surface 140. That is, the ink supply portion 34 extends in the front-rear direction 51/52. The ink supply portion 34 has a hollow cylindrical shape. The ink supply opening 71 is formed at the tip end (front end) of the ink supply portion 34. The ink supply opening 71 is in communication with the storage chamber 36 and the sub-storage chamber 37. Although not illustrated in the drawings, the ink supply opening 71 can be opened or closed by a valve accommodated in the ink supply portion 34.

Incidentally, the valve may not be provided in the ink supply portion 34 for opening and closing the ink supply opening 71. Alternatively, for example, the ink supply opening 71 may be initially closed by a film. The film may be broken by the ink needle 102 during the insertion of the ink cartridge 30 into the cartridge receiving portion 110, so that the tip end portion of the ink needle 102 can enter into the internal space of the ink supply portion 34 through the ink supply opening 71. Still alternatively, the ink supply opening 71 may be closed by elastic deformation of an elastic member such as rubber and elastomer. The ink supply opening 71 may be forcibly opened when the ink needle 102 is pierced into the ink supply opening 71.

As illustrated in FIGS. 3 and 5, a plate member 67 is provided on the cartridge case 33 to protrude upward from the upper surface 142 of the cartridge case 33. The plate member 67 is positioned rearward of and above the electrode group 65, and forward of the reflection plate 132 of the counter-detecting portion 62 in the frontward direction 51. The plate member 67 has a generally flat plate-like shape extending in the front-rear direction 51/52 and up-down direction 53/54.

As illustrated in FIG. 6A, the plate member 67 is arranged at a positioned aligned with a center of the reflection plate 132 in the left-right direction 55/56. The plate member 67 may be formed by stacking a light-shielding sheet on a surface of a light-transmissive member, or may be formed by a light-shielding member.

The plate member 67 has an upper end that is positioned higher than a detecting position of the sensor 103. The detecting position of the sensor 103 (i.e., the position of an optical path 103*a* formed by the light of the sensor 103) is separated upward from the electrode group 65 by a first distance D1 in the upward direction 54 (see FIG. 5). Hence, during the insertion and removal of the ink cartridge 30 to and from the cartridge receiving portion 110, the plate member 67 can move across the optical path 103*a* of the sensor 103, so that the plate member 67 can be detected by the sensor 103.

Incidentally, the sensor 103 can detect the plate member 67 in a case where the light emitted from the light emitting portion is incident on the plate member 67 before arriving at the light receiving portion, since the intensity of the light received at the light receiving portion becomes less than the predetermined intensity, for example, zero. Note that the plate member 67 may perfectly block the light traveling in the left-right direction 55/56, or may partially attenuate the light, or may bend the light to change a traveling direction thereof, or may fully reflect the light.

The plate member 67 is pivotable about an axis A extending in the up-down direction 53/54. Specifically, the plate member 67 has a lower end on which a pivot shaft 68 defining the axis A is fixedly provided. The pivot shaft 68 is positioned at a front end on the lower end of the plate member 67. The pivot shaft 68 is inserted in a hole (not shown) formed in the upper surface 142 of the cartridge case 33 such that the pivot shaft 68 is rotatable relative to the upper surface 142. The non-illustrated hole has an inner diameter slightly greater than an outer diameter of the pivot shaft 68 and functions as a bearing for the pivot shaft 68. The pivot shaft 68 inserted in the hole is so configured not to be detached from the hole. With this structure, as illustrated in FIG. 6B, the plate member 67 is pivotable about the axis A defining a center of the pivot shaft 68 such that the plate member 67 is movable between a first position (indicated by a broken line in FIG. 6B) and a second position (indicated by a solid line in FIG. 6B). In the first position, the plate member 67 extends parallel to the front-rear direction 51/52. In the second position, the plate member 67 extends in a direction crossing the front-rear direction 51/52. Incidentally, the means for preventing removal of the pivot shaft 68 from the upper surface 142 may be arbitrary, provided that the pivot shaft 68 is rotatable inside the hole formed in the upper surface 142.

The plate member 67 may be configured to be maintained at the first position by, for example, a torsion spring (not shown). In this case, the plate member 67 may be pivoted toward the second position against an urging force of the torsion spring upon application of a force acting in a pivoting direction about the axis of the pivot shaft 68. With this configuration, since the plate member 67 is normally maintained at the first position, entry of the plate member 67 into the corresponding slit 108 can be facilitated and the plate member 67 can reliably block the light emitted from the light emitting portion of the sensor 103.

On the upper surface 142 of the cartridge case 33, a pair of restricting portions 70 is provided. The restricting portions 70 are configured to abut on the plate member 67 at the second position to restrict further pivoting of the plate member 67. The restricting portions 70 are positioned away from each other in the left-right direction 55/56. Each restricting portion 70 protrudes upward in the upward direction 54 from the upper surface 142 of the cartridge case 33. Each restricting portion 70 is arranged at such a position that the plate member 67 at the first position and the plate member 67 at the second position form an angle of 45 degrees therebetween. Incidentally, the angle formed between the plate member 67 at the first position and the plate member 67 at the second position need not be 45 degrees, but may be 90 degrees, for example. Alternatively, the restricting portions 70 may be omitted.

As illustrated in FIG. 5, the plate member 67 and the reflection plate 132 of the counter-detecting portion 62 define a space 66 therebetween in the front-rear direction 51/52. In other words, when the plate member 67 is at the first position, the plate member 67 and the reflection plate 132 are aligned with each other in the front-rear direction 51/52 with the space 66 interposed therebetween. The space 66 provides communication in the left-right direction 55/56.

<Positional Relationship Among the Counter-Detecting Portion 62, Electrode Group 65, and Plate Member 67>

As illustrated in FIG. 7, the counter-detecting portion 62, the IC circuit board 64, and the plate member 67 are positioned at the upper surface 142 of the cartridge case 33. The upper end of the plate member 67 and the ground electrode 65C both intersect with an imaginary plane 180 extending in the up-down direction 53/54 and the front-rear direction 51/52 (as indicated by a dotted chain line in FIG. 7). The imaginary plane 180 is positioned at the center of the cartridge case 33 in the left-right direction 55/56. Further, the imaginary plane 180 is at a position coincident with the center in the left-right direction 55/56 of the plate member 67. Hence, the center in the left-right direction 55/56 of the plate member 67 is coincident with the center in the left-right direction 55/56 of the cartridge case 33.

The center in the left-right direction 55/56 of the ground electrode 65C is contained in the imaginary plane 180. In other words, the center of the ground electrode 65C in the left-right direction 55/56 is positioned on the imaginary plane 180. The ground electrode 65C has a dimension L1 in the left-right direction 55/56 greater than a dimension L2 in the left-right direction 55/56 of the upper surface of the plate member 67 (L1>L2).

<Operation for Attaching Ink Cartridge 30 to Cartridge Receiving Portion 110>

Next, a process of attaching the ink cartridge 30 to the cartridge receiving portion 110 will be described.

Prior to the attachment of the ink cartridge 30 to the cartridge receiving portion 110, the ink supply opening 71 of the ink supply portion 34 is closed by the valve (not illustrated). Hence, outflow of the ink from the storage chamber 36 to the outside of the ink cartridge 30 is interrupted.

Further, in the cartridge receiving portion 110 before attachment of the ink cartridge 30 thereto, no member is positioned between the light emitting portion and the light receiving portion of the sensor 103. Therefore, a high-level signal is outputted from the sensor 103 to the controller 130 of the printer 10. Incidentally, at this time, a cover (not illustrated) of the printer 10 is opened, and the opening 112 of the cartridge receiving portion 110 is exposed to the outside.

As illustrated in FIG. 8, the ink cartridge 30 is inserted frontward into the casing 101 through the opening 112 of the cartridge receiving portion 110. As the ink cartridge 30 is inserted frontward, the plate member 67 comes to the position between the light emitting portion and the light receiving portion of the sensor 103. When the front end of the plate member 67 moves frontward past the optical path 103*a* of the sensor 103, the signal output to the controller 130 of the printer 10 is changed from the high-level signal to the low-level signal.

As the ink cartridge 30 is inserted further frontward, the space 66 then comes to the position between the light emitting portion and the light receiving portion of the sensor 103, as illustrated in FIG. 9. When the rear end of the plate member 67 moves past the optical path 103*a* of the sensor 103 frontward, the signal output to the controller 130 of the printer 10 is changed from the low-level signal to the high-level signal.

As the ink cartridge 30 is further inserted frontward into the cartridge receiving portion 110, the ink supply portion 34 enters inside the guide portion 105 and the ink needle 102 enters into the ink supply opening 71. In this way, the ink supply portion 34 is fixed in position, and the ink stored in the storage chamber 36 is now allowed to flow into the corresponding tube 20 through the ink needle 102.

Further, as illustrated in FIG. 10, the plate member 67, which is moving frontward after passing through the position between the light emitting portion and the light receiving portion of the sensor 103, then enters into the corresponding slit 108. In the attached state, the counter-detecting portion 62 is positioned on the optical path 103*a* of the sensor 103, and the plate member 67 is located inside the slit 108.

Further, as illustrated in FIG. 11, the IC circuit board 64 arrives at the position immediately below the three contacts 106, so that the electrodes 65A, 65B, 65C of the electrode group 65 are respectively electrically connected to the corresponding contacts 106 while resiliently deforming the respective contacts 106 upward. Incidentally, at this time, the protruding portion 43 is in abutment with the locking portion (not illustrated) of the cartridge receiving portion 110, thereby maintaining the ink cartridge 30 in the attached state.

The controller 130 of the printer 10 is configured to determine whether the attachment of the ink cartridge 30 to the cartridge receiving portion 110 is complete based on the change in the output signal during the attachment process of the ink cartridge 30, as illustrated in FIG. 12. Specifically, the controller 130 determines that a proper ink cartridge 30 has been attached to the cartridge receiving portion 110 upon detection of the following change in the output of the signal from the sensor 103: from the high-level signal to the low-level signal (because of the interruption of the optical path 103*a* by the plate member 67); and then from the low-level signal to the high-level signal (because of the presence of the space 66 at the optical path 103*a*), and then from the high-level signal to the low-level signal (because of the interruption of the optical path 103*a* by the counter-detecting portion 62). Here, the expression "proper ink cartridge 30" implies that the ink is filled in both of the storage chamber 36 and the sub-storage chamber 37, that is, the amount of ink stored in the sub-storage chamber 37 is sufficient enough to contact the first reflection surface 134A and the second reflection surface 134B of the prism 131.

The controller 130 determines that the ink cartridge 30 attached to the cartridge receiving portion 110 is abnormal when detecting any fluctuation different from that shown in FIG. 10 in the signal outputted from the sensor 103. In response to the determination, the controller 130 is configured to notify the user about the abnormality, for example, by displaying an error message on a display.

Incidentally, the controller 130 may be configured to start detecting whether the ink cartridge 30 is attached to the cartridge receiving portion 110 upon receipt of a signal from a cover sensor (not illustrated) indicating that the cover of the printer 10 closes the opening 112 of the cartridge receiving portion 110. In this case, the controller 130 may start accessing the IC circuit board 64 upon receipt of the signal from the cover sensor, and may determine that the ink cartridge 30 is attached to the cartridge receiving portion 110 when detecting that the information in the IC circuit board 64 is accessible (readable) normally or power supply to the IC circuit board 64 is performed.

For detaching the ink cartridge 30 from the cartridge receiving portion 110, the ink cartridge 30 is moved rearward such that the space 66 and the plate member 67 sequentially move rearward past the optical path 103*a* of the sensor 103. Hence, the signal outputted from the sensor 103 to the controller 130 is changed from the high-level signal to the low-level signal, and then from the low-level signal to the high-level signal.

The change in the output signal attributed to the detection of the plate member 67 at the sensor 103 may be used to determine whether or not the ink cartridge 30 is attached to the cartridge receiving portion 110, or to identify the type of the ink cartridge 30 attached to the cartridge receiving portion 110 (for example, to identify the color of the ink stored in the ink cartridge 30).

<Functions and Technical Advantages of the Embodiment>

According to the embodiment, each of the plate member 67 and the counter-detecting portion 62 can be detected by the same sensor 103. Further, the plate member 67 is capable of pivoting upon application of an impact during attachment of the ink cartridge 30 to the cartridge receiving portion 110 or by a fall of the ink cartridge 30 onto a floor. Accordingly, the plate member 67 is less likely to deform by the impact impinged thereon.

According to the embodiment, the space 66 is formed between the plate member 67 and the counter-detecting portion 62 in the front-rear direction 51/52. With this structure, there can be a distinct difference in the output signal of the sensor 103 between the detection of the plate member 67 and the detection of the counter-detecting portion 62.

According to the ink cartridge 30 of the embodiment, at least one of the following technical advantages can be obtained. In the ink cartridge 30, the upper end of the plate member 67 and the ground electrode 65C are both positioned to intersect the same imaginary plane 180 positioned at the center of the cartridge case 33 in the left-right direction 55/56. This arrangement can restrain occurrence of interference between the ground electrode 65C and the sensor 103 configured to optically detect the plate member 67. Further, the electrical contact between the ground electrode 65C and the corresponding contact 106 can be stably secured even in a case where the ink cartridge 30 attached to the cartridge receiving portion 110 is slanted relative to the front-rear direction 51/52 as a result of the tilting movement of ink cartridge 30 during the attachment process. Further, even in the case where the ink cartridge 30 is attached to the cartridge receiving portion 110 in a tilted posture relative to the front-rear direction 51/52 as a result of such unstable insertion process of the ink cartridge 30, the front end or the rear end of the plate member 67 are less likely to be positionally displaced with respect to the front-rear direction 51/52.

Further, according to the embodiment, the pivot shaft 68 is positioned at the front end of the plate member 67 at the first position. Hence, the front end of the plate member 67 does not move in the left-right direction 55/56 relative to the upper surface 142. With this structure, the front end of the plate member 67 can easily enter into the slit 108 during the insertion of the ink cartridge 30 into the cartridge receiving portion 110.

Further, according to the embodiment, the restricting portions 70 are configured to abut on the plate member 67 at the second position, thereby restricting the pivoting range of the plate member 67. This configuration can restrict the plate member 67 from pivoting excessively beyond the pivoting range of the plate member 67, such that the plate member 67 is less likely to be damaged.

Further, the dimension L1 in the left-right direction 55/56 of the ground electrode 65C is greater than the dimension L2 in the left-right direction 55/56 of the upper surface of the plate member 67 at the first position. This configuration can suppress interference of the plate member 67 with the sensor 103 even if the ink cartridge 30 is tilted in the attached state.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the in the above-described embodiment, the plate member 67 is configured to pivot about the axis A passing through the center of the pivot shaft 68. However, the pivoting movement of the plate member 67 need not be realized by means of the pivot shaft 68, as long as the plate member 67 is pivotable about the axis A extending in the up-down direction 53/54. For example, the plate member 67 may be pivotable relative to the upper surface 142 through a columnar protrusion extending upward from the upper surface 142 of the cartridge case 33. In this case, the lower end of the plate member 67 is formed with a hole in which the columnar protrusion of the upper surface 142 is inserted to allow the plate member 67 to be rotatable relative to the columnar protrusion. With this structure, the plate member 67 is pivotable about the axis A passing through the center of the hole with the columnar protrusion inserted in the hole of the plate member 67.

Further, in the above-described embodiment, the electrode group 65 includes the power source electrode 65A, the signal electrode 65B and the ground electrode 65C. However, as illustrated in FIG. 13, a dummy electrode 65D may be further provided beside and outside of the power source electrode 65A. Alternatively, the dummy electrode 65D may be positioned beside and outside of the signal electrode 65B. In other words, the power source electrode 65A or the signal electrode 65B may be positioned in between the dummy electrode 65D and the ground electrode 65C in the left-right direction 55/56.

FIG. 14 illustrates an ink cartridge 230 according to a modification to the embodiment. The ink cartridge 230 includes an IC circuit board 264 that includes a circuit board

80, the electrode group 65, an electrical circuit 81, and a battery 82. The electrode group 65 is positioned on an upper surface of the circuit board 80, whereas the electrical circuit 81 and battery 82 are mounted on a lower surface of the circuit board 80. The IC circuit board 264 is provided on the upper surface 142 such that an entirety of the upper surface of the IC circuit board 264 is not exposed to the outside. That is, only a part of the upper surface of the circuit board 80 is exposed to the outside, the part being provided with the electrode group 65, and a remaining part of the upper surface of the IC circuit board 264 may be covered by the cartridge case 33 so as not to be exposed to the outside. An enlarged view of the lower surface of the IC circuit board 264 is illustrated in FIG. 14 in a region enclosed by a two-dotted chain line.

In the above-described embodiment, the restricting portions 70 are provided to protrude upward from the upper surface 142 of the cartridge case 33. However, an alternative structure for restricting the pivoting range of the plate member 67 is conceivable. As an example, FIGS. 15A and 15B illustrate a restricting portion 370 in a form of a recess 350 formed in the upper surface 142 of the cartridge case 33. The recess 350 is recessed downward from the upper surface 142. In a plan view, the recess 350 has a fan-like shape whose center is directed frontward and whose arc faces rearward. The recess 350 has a bottom surface 350*a*, a pair of inner walls 350*b* extending upward from the bottom surface 350*a*, and a rear peripheral wall constituting the arc of the fan-like shape. The fan-like shape constituting the recess 350 has a radius slightly greater than the dimension in the front-rear direction 51/52 of the plate member 67 at the first position.

The plate member 67 is disposed within the recess 350. Specifically, the plate member 67 is arranged such that the front end of the plate member 67 is positioned near and rearward of the center of the fan-like shape of the recess 350, and the rear end of the plate member 67 is positioned adjacent to the rear peripheral wall of the fan-like shape. The pivot shaft 68 of the plate member 67 is rotatably inserted in a hole formed in the bottom surface 350*a* of the recess 350. The plate member 67 at the first position is pivotable in the left-right direction 55/56 about the axis A of the pivot shaft 68 until the plate member 67 abuts on either left or right one of the pair of inner walls 350*b* of the recess 350. In the second position, the plate member 67 is in abutment with the right or left inner wall 350*b*. That is, the plate member 67 is pivotable in the left-right direction 55/56 in a range defined between the pair of inner walls 350*b* of the recess 350. The pair of inner walls 350*b* of the recess 350 thus functions as the restricting portion 370 in this modification. The restricting portion 370 of this configuration can make the plate member 67 thinner.

In the above-described embodiment, the pivot shaft 68 is positioned at the front end on the lower end of the plate member 67. FIG. 16 illustrates a plate member 467 according to a modification where a pivot shaft 468 corresponding to the pivot shaft 68 is provided at a rear end on a lower end of the plate member 467. With this structure, even when the plate member 467 attempts to enter the slit 108 at a location offset from the opening of the slit 108, the front end of the plate member 467 can pivotably move when abutting on inner surfaces of the slit 108 or a periphery defining the opening of the slit 108. Accordingly, the plate member 467 is likely to be guided into the slit 108.

Here, the restricting portions 70 may not be provided on the upper surface 142. When the plate member 467 approaches a location offset from the slit 108, the plate member 467 may not be able to enter into the slit 108. However, even in this case, the plate member 467 abuts on the wall surface 107 on which the slit 108 is open, so that the plate member 467 can pivot freely, by 360 degrees, about the axis of the pivot shaft 468, which does not hinder attachment of the ink cartridge 30 to the cartridge receiving portion 110.

In the above-described embodiment, the space 66 positioned rearward of the plate member 67 at the first position and frontward of the counter-detecting portion 62 (the reflection plate 132) serves as a light-transmissive region. However, the light-transmissive region need not be a space. For example, FIG. 17A illustrates an alternative structure in which a light-transmissive member 569 having a higher light transmittance than the plate member 67 is provided in place of the space 66. The light-transmissive member 569 is integral with the rear end of the plate member 67 in the first position.

In this modification, the light emitted from the light emitting portion of the sensor 103 can pass through the light-transmissive member 569 and the light having passed through the light-transmissive member 569 can reach the light receiving portion of the sensor 103 to be detected thereby. The light-transmissive member 569 may be made of any material, as long as the light emitted from the light emitting portion of the sensor 103 can pass through the light-transmissive member 569. For example, the light-transmissive member 569 may be made of glass or resin having high light transmittance (such as acryl resin). The upper end of the light-transmissive member 569 is positioned above the detecting position of the sensor 103. The upper end of the light-transmissive member 569 is at the same position (i.e., at the same height) as the upper end of the plate member 67 in the up-down direction 53/54. Accordingly, as illustrated in FIG. 17B, the plate member 67 is pivotable together with the light-transmissive member 569 about the axis A of the pivot shaft 68.

FIG. 17C illustrates a light-transmissive member 669 according to another modification. The light-transmissive member 669 is provided integrally with a front surface 132*a* of the reflection plate 132, the front surface 132*a* facing frontward. Accordingly, the plate member 67 alone is pivotable about the axis A of the pivot shaft 68, while the light-transmissive member 669 is immovable irrespective of the movement of the plate member 67.

In the above-described embodiment, the space 66 serving as a light-transmissive region is provided between the plate member 67 and the reflection plate 132 of the counter-detecting portion 62 in the front-rear direction 51/52. However, the light-transmissive region may not be provided, as illustrated in FIGS. 18A and 18B. Specifically, as illustrated in FIG. 18B, a front surface 732*a* of a reflection plate 732 is concave rearward to form an arcuate shape in a plan view. A rear end of a plate member 767 faces the front surface 732*a* in the front-rear direction 51/52. Thus, the rear end of the plate member 767 overlaps the reflection plate 732 in the front-rear direction 51/52 in a side view, as illustrated in FIG. 18A. The plate member 767 is pivotable about the axis A of the pivot shaft 68 such that the rear end of the plate member 767 moves in the left-right direction 55/56 along the concaved front surface 732*a* of the reflection plate 732.

FIG. 18C illustrates another configuration in which no light-transmissive region is formed. Specifically, in the example of FIG. 18C, a pivot shaft 868 of a plate member 867 is provided at a rear end on a lower end of the plate member 867. A reflection plate 832 has an upper surface in which a slit 832*d* is formed. The slit 832*d* extends in the front-rear direction 51/52 and is open upward on the upper surface of the reflection plate 832. The slit 832*d* extends in the front-rear direction 51/52 to provide communication between a front surface to a rear surface of the reflection plate 832. Incidentally, the slit 832*d* need not reach the rear surface of the reflection plate 832. The rear end of the plate member 867 is positioned at a position near a front end of the slit 832*d*.

In the above-described embodiment, the counter-detecting portion 62 includes the prism 131 and the reflection plate 132. Alternatively, the counter-detecting portion 62 may be provided as a pivoting member configured to pivotably move depending on the liquid level of the ink stored in the storage chamber 36. In this case, the internal frame 35 may house a portion of the pivoting member therein, and a portion of the internal frame 35 may be formed to protrude upward beyond the upper surface 142 in the upward direction 54 so that the sensor 103 can detect the protruding portion of the internal frame 35.

Further, the ink cartridge 30 may not include the internal frame 35. In this case, the storage chamber 36 may be defined as an inner space of the cartridge case 33 that constitutes an outer shell of the ink cartridge 30.

In the embodiment described above, the counter-detecting portion 62 is configured to change a state of the signal outputted from the sensor 103 to the controller 130 according to the amount of the ink stored in the storage chamber 36, but configurations other than that in the embodiment may be employed. For example, the counter-detecting portion 62 may change a state of light outputted from a sensor in the printer 10 when attachment of the ink cartridge 30 to the cartridge-attachment section 110 is completed so that the printer 10 can detect that the ink cartridge 30 has been completely attached to the cartridge-attachment section 110. In this case, the counter-detecting portion 62 (at least the reflection plate 132) may be formed or may be colored such that these components have low light transmittance. Still further, the counter-detecting portion 62 may be so configured that arbitrary information on the ink cartridge 30 attached to the printer 10 can be detected by the printer 10.

In the above-described embodiment, the ink is used as an example of liquid of the disclosure. However, instead of the ink, pretreatment liquid configured to be ejected onto a sheet prior to the ejection of the ink for printing may be stored in the liquid cartridge as the liquid. As an alternative, cleaning liquid for cleaning the recording head 21 may be stored in the liquid cartridge.

<Remarks>

The ink cartridges 30, 230 are examples of a liquid cartridge. The cartridge case 33 is an example of a cartridge case of the liquid cartridge. The ink supply portion 34 is an example of a liquid supply portion. The IC circuit boards 64, 264 are examples of a circuit board. The electrode group 65 is an example of an electrode group. The counter-detecting portion 62 is an example of a residual-amount detecting portion. The counter-detecting portion 62 is another example of a cartridge detecting portion. The reflection plates 132, 732, 832 are examples of an optical access portion. The plate members 67, 267, 467, 767, 867 are examples of a plate member. The space 66, and the light-transmissive member 569, 669 are examples of a light-transmissive region. The power source electrode 65A is an example of a first electrode. The signal electrode 65B is an example of a second electrode. The ground electrode 65C is an example of a third electrode. The imaginary plane 180 is an example of an imaginary plane. The prism 131 is an example of a prism. The first reflection surface 133A is an example of a first reflecting portion, and the second reflection plate 133B is an example of a second reflecting portion. The printer 10 is an example of a liquid consuming device. The cartridge receiving portion 110 is an example of a cartridge receiving portion. The recording head 21 is an example of a consuming portion. The ink needle 102 is an example of a liquid supply tube. The sensor 103 is an example of a sensor.

What is claimed is:

1. A liquid cartridge attachable to a printer in an attached posture by being moved in a front-rear direction crossing an up-down direction along a gravitational direction, the liquid cartridge comprising:

a cartridge case defining a liquid storage chamber therein;

a liquid supply portion protruding frontward from a front surface of the cartridge case and configured to supply liquid stored in the liquid storage chamber to an outside of the liquid storage chamber;

a residual-amount detecting portion configured to change a state of incident light according to an amount of the liquid stored in the liquid storage chamber, the residual-amount detecting portion comprising an optical access portion accessible by light traveling in a left-right direction crossing the up-down direction and the front-rear direction in the attached posture, the optical access portion being positioned above the liquid storage chamber in the attached posture; and a plate member pivotable about a pivot axis between a first position and a second position, the pivot axis extending in the up-down direction in the attached posture, the plate member being positioned above the liquid storage chamber and frontward of the optical access portion in the attached posture, wherein, in the attached posture, the plate member extends in the front-rear direction at the first position, and the plate member extends in a direction crossing the front-rear direction at the second position.

2. The liquid cartridge according to claim 1, further comprising a circuit board comprising an electrode group comprising at least three electrodes, the at least three electrodes being exposed upward to an outside in the attached posture, wherein the plate member has a portion positioned above and away from the electrode group by a first distance in the attached posture, and the portion being positioned rearward of the electrode group in the attached posture.

3. The liquid cartridge according to claim 2, wherein the optical access portion has a portion positioned above and away from the electrode group by the first distance in the attached posture.

4. The liquid cartridge according to claim 2, further comprising a light-transmissive region whose light transmittance is higher than light transmittance of the plate member, wherein, in the attached posture, the light-transmissive region is positioned rearward of the plate member at the first position and frontward of the residual-amount detecting portion, and the light-transmissive region has a portion positioned above and away from the electrode group by the first distance in the attached posture.

5. The liquid cartridge according to claim 4, wherein the light-transmissive region is provided as a space.

6. The liquid cartridge according to claim 4, wherein the light-transmissive region is provided as a light-transmissive member.

7. The liquid cartridge according to claim 2, wherein the electrode group comprises a first electrode, a second electrode, and a third electrode arrayed in the left-right direction such that the third electrode is positioned between the first electrode and the second electrode in the left-right direction, each of the first electrode, the second electrode and the third electrode being configured to be electrically connected to the printer when the liquid cartridge is attached to the printer, wherein the third electrode is a ground electrode for grounding, and wherein the third electrode and an upper end of the plate member at the first position are both arranged to intersect an imaginary plane extending in the up-down direction and the front-rear direction.

8. The liquid cartridge according to claim 1, wherein the plate member has a shaft defining the pivot axis, the shaft being positioned at a lower front end of the plate member at the first position in the attached posture.

9. The liquid cartridge according to claim 8, wherein the shaft is positioned below an upper surface of the cartridge case.

10. The liquid cartridge according to claim 1, wherein the optical access portion has widthwise ends in the left-right direction, and wherein an upper end of the plate member at the first position is positioned between the widthwise ends of the optical access portion in the left-right direction.

11. The liquid cartridge according to claim 1, further comprising a restricting portion configured to abut on the plate member at the second position to restrict further pivoting of the plate member.

12. The liquid cartridge according to claim 11, wherein the restricting portion is a protrusion protruding upward from an upper surface of the cartridge case.

13. The liquid cartridge according to claim 11, wherein the restricting portion is a recess that is recessed downward from an upper surface of the cartridge case.

14. The liquid cartridge according to claim 1, wherein the residual-amount detecting portion further comprises a prism having a reflection surface whose reflection manner is dependent on whether or not the reflection surface is in contact with the liquid, and wherein the optical access portion comprises: a first reflecting portion configured to reflect the light incident thereon toward the prism; and a second reflecting portion configured to reflect the light from the prism outward in the left-right direction.

15. The liquid cartridge according to claim 1, wherein the light traveling in the left-right direction is configured to be incident on each of the plate member at the first position and the optical access portion during a process for attaching the liquid cartridge to the printer.

16. A liquid cartridge comprising:

a cartridge case defining a liquid storage chamber therein;

a liquid supply portion protruding frontward from a front surface of the cartridge case in a front-rear direction and configured to supply liquid stored in the liquid storage chamber to an outside of the liquid storage chamber;

a cartridge detecting portion comprising an optical access portion positioned upward relative to and away from the liquid supply portion in an up-down direction crossing the front-rear direction, the optical access portion being accessible by light traveling in a left-right direction crossing the up-down direction and the front-rear direction, the optical access portion being positioned above the liquid storage chamber in the up-down direction; and a plate member pivotable about a pivot axis extending in the up-down direction between a first position and a second position, the plate member being positioned above the liquid storage chamber in the up-down direction and frontward of the optical access portion in the front-rear direction, wherein the plate member extends in the front-rear direction at the first position, and the plate member extends in a direction crossing the front-rear direction at the second position.

17. The liquid cartridge according to claim 16, wherein the cartridge detecting portion is configured to change a state of incident light according to an amount of the liquid stored in the liquid storage chamber.

18. The liquid cartridge according to claim 16, further comprising a circuit board comprising an electrode group comprising at least three electrodes facing upward and exposed upward to an outside, wherein the plate member has a portion positioned above and away from the electrode group by a first distance in the up-down direction, and the portion being positioned rearward of the electrode group in the front-rear direction.

19. The liquid cartridge according to claim 18, wherein the optical access portion has a portion positioned above and away from the electrode group by the first distance in the up-down direction.

20. The liquid cartridge according to claim 18, further comprising a light-transmissive region whose light transmittance is higher than light transmittance of the plate member, wherein the light-transmissive region is positioned rearward of the plate member at the first position and frontward of the cartridge detecting portion in the front-rear direction, and the light-transmissive region has a portion positioned above and away from the electrode group by the first distance in the up-down direction.

21. The liquid cartridge according to claim 18, wherein the electrode group comprises a first electrode, a second electrode, and a third electrode arrayed in the left-right direction such that the third electrode is positioned between the first electrode and the second electrode in the left-right direction, wherein the third electrode is a ground electrode for grounding, and wherein the third electrode and an upper end of the plate member at the first position are both arranged to intersect an imaginary plane extending in the up-down direction and the front-rear direction.

22. The liquid cartridge according to claim 16, wherein the optical access portion has widthwise ends in the left-right direction, and wherein an upper end of the plate member at the first position is positioned between the widthwise ends of the optical access portion in the left-right direction.

23. The liquid cartridge according to claim 16, further comprising a restricting portion configured to abut on the plate member at the second position to restrict further pivoting of the plate member.

24. The liquid cartridge according to claim 16, wherein the light traveling in the left-right direction is configured to be incident on each of the plate member at the first position and the optical access portion during a process for attaching the liquid cartridge to a printer.

* * * * *